US008764566B2

(12) United States Patent
Miltenberger et al.

(10) Patent No.: US 8,764,566 B2
(45) Date of Patent: Jul. 1, 2014

(54) INTERNET REMOTE GAME SERVER

(75) Inventors: Paul Douglas Miltenberger, Las Vegas, NV (US); Kaushal Sheth, San Ramon, CA (US); Ryan Michael Fissell, San Francisco, CA (US); Carmen Atienza Tan, Oakland, CA (US); Andy O. Bryson, San Francisco, CA (US); Shanmugapriyan Devaraj, Houston, TX (US); Theodore YuChiang Cheng, San Francisco, CA (US)

(73) Assignee: IGT, Las Vegas, NV (US)

( * ) Notice: Subject to any disclaimer, the term of this patent is extended or adjusted under 35 U.S.C. 154(b) by 609 days.

(21) Appl. No.: 11/598,260

(22) Filed: Nov. 10, 2006

(65) Prior Publication Data

US 2007/0202941 A1 Aug. 30, 2007

Related U.S. Application Data

(60) Provisional application No. 60/776,477, filed on Feb. 24, 2006.

(51) Int. Cl.
*A63F 9/24* (2006.01)
*A63F 13/12* (2006.01)

(52) U.S. Cl.
USPC .................... 463/42; 463/29; 463/30; 463/40

(58) Field of Classification Search
USPC ........... 463/12, 13, 16–22, 25, 42, 43, 29, 30, 463/40
See application file for complete search history.

(56) References Cited

U.S. PATENT DOCUMENTS

| | | | |
|---|---|---|---|
| 4,856,787 | A | 8/1989 | Itkis |
| 5,762,552 | A | 6/1998 | Vuong et al. |
| 5,980,384 | A | 11/1999 | Barrie |
| 6,135,887 | A | 10/2000 | Pease et al. |
| 6,149,522 | A | 11/2000 | Alcorn et al. |
| 6,264,561 | B1 | 7/2001 | Saffari et al. |

(Continued)

FOREIGN PATENT DOCUMENTS

| | | |
|---|---|---|
| EP | 1231577 | 8/2002 |
| WO | WO 01/54091 | 7/2001 |

(Continued)

OTHER PUBLICATIONS

McClarnon, Jeff, Correspondence dated Apr. 30, 2008, re: U.S. Appl. No. 11/598,260, 2 pp.

(Continued)

*Primary Examiner* — Werner Garner
(74) *Attorney, Agent, or Firm* — Foley & Lardner LLP

(57) ABSTRACT

A gaming system, including a game outcome server, an account handling device and a client device communicatively coupled via network, is described. The game outcome server may be operable to send command, instructions, data or combinations thereof that allow an interface for a wager-based game to be generated on the client device, generate a game outcome for the wager-based game that is displayed on the client device and generate an update to a player balance maintained on the account handling device. The account handling device is operable to provide gaming services related to the game play on the client device including a) web-site hosting where the web-site lists available gaming services including games provided by the game outcome server, b) accounting, c) money handling including player account management and d) player eligibility functions.

31 Claims, 8 Drawing Sheets

(56) References Cited

U.S. PATENT DOCUMENTS

| | | | | |
|---|---|---|---|---|
| 6,409,602 | B1 | 6/2002 | Wiltshire et al. | |
| 6,645,077 | B2 | 11/2003 | Rowe | |
| 6,685,567 | B2 | 2/2004 | Cockerille et al. | |
| 6,773,345 | B2 | 8/2004 | Walker et al. | |
| 6,804,763 | B1 | 10/2004 | Stockdale et al. | |
| 6,853,973 | B2 | 2/2005 | Matthews et al. | |
| 6,863,608 | B1 | 3/2005 | LeMay et al. | |
| 7,111,141 | B2 | 9/2006 | Nelson | |
| 7,384,339 | B2 | 6/2008 | LeMay et al. | |
| 7,515,718 | B2 | 4/2009 | Nguyen et al. | |
| 2002/0042296 | A1 | 4/2002 | Walker et al. | |
| 2002/0142825 | A1 | 10/2002 | Lark et al. | |
| 2002/0151344 | A1 | 10/2002 | Tanskanen | |
| 2003/0064805 | A1* | 4/2003 | Wells | 463/39 |
| 2003/0125973 | A1 | 7/2003 | Matthews et al. | |
| 2004/0152511 | A1 | 8/2004 | Nicely et al. | |
| 2004/0185933 | A1 | 9/2004 | Nicely | |
| 2004/0192442 | A1 | 9/2004 | Wells et al. | |
| 2004/0242322 | A1* | 12/2004 | Montagna et al. | 463/29 |
| 2005/0159200 | A1 | 7/2005 | Nicely et al. | |
| 2005/0176500 | A1 | 8/2005 | Matthews et al. | |
| 2005/0192086 | A1* | 9/2005 | Walker et al. | 463/20 |
| 2005/0272492 | A1* | 12/2005 | Stelly, III | 463/1 |
| 2006/0025207 | A1 | 2/2006 | Walker et al. | |

FOREIGN PATENT DOCUMENTS

| | | |
|---|---|---|
| WO | WO 01/84516 | 11/2001 |
| WO | WO 02/099760 | 12/2002 |
| WO | WO 02/101486 | 12/2002 |
| WO | WO 03/089084 | 10/2003 |
| WO | WO 2004/090818 | 10/2004 |
| WO | WO 2005/033826 | 4/2005 |

OTHER PUBLICATIONS

WO International Search Report mailed Jul. 24, 2007 from International Application No. PCT/US2007/004873, including Notification of Transmittal, 7 pp.

WO Written Opinion mailed Jul. 24, 2007 from International Application No. PCT/US2007/004873, 8 pp.

William R. Brosnan, "Using a Gaming Machine as a Server", IGT, U.S. Appl. No. 09/595,798, filed Jun. 16, 2000, pp. 1-45.

EP Office Action dated Feb. 13, 2009 from Application No. 07751619.3, 3 pgs.

EPO Summons to Attend Oral Proceedings pursuant to Rule 115(1) EPS dated Oct. 5, 2009 in Application No. 07751619.3.

Australian First Report dated Mar. 28, 2011 issued in AU2007221104.

EP Summons to Attend Oral Proceedings (pursuant to Rule 115901) EPS issued Nov. 18, 2009 in EP07751619.3.

EP Result of Consultation issued Mar. 4, 2010 in EP07751619.3.

EP Summons to Attend Oral Proceedings (pursuant to Rule 115901) EPS issued Dec. 22, 2010 in EP07751619.3.

EP Minutes of Oral Proceedings issued Apr. 20, 2011 in EP07751619.3.

EP Board of Appeal Decision issued Jul. 7, 2011 in EP07751619.3.

EP Decision under Rule 71(3) issued Sep. 16, 2011 in EP07751619.3.

EP Search Report issued May 23, 2011 in EP11154171.0.

European Office Action dated Feb. 20, 2012 issued in Application No. 11154171.0.

Australian Second Report dated Sep. 20, 2011 issued in AU2007221104.

Australian Notice of Acceptance dated Jan. 31, 2012 issued in AU2007221104.

Extended European Search Report and Opinion dated May 10, 2011 issued in EP11154171.0.

* cited by examiner

INTERNET REMOTE GAME SERVER

RELATED APPLICATION DATA

The present application claims priority under 35 U.S.C. 119(e) to U.S. Provisional Patent Application No. 60/776,477, filed on Feb. 24, 2006, naming Miltenberger, et al., as inventors, and titled "Internet Remote Game Server," which is incorporated herein by reference and for all purposes.

TECHNICAL FIELD

The present invention relates generally to gaming devices and systems, and more specifically to remote game servers.

BACKGROUND

Casinos and other forms of gaming comprise a growing multi-billion dollar industry both domestically and abroad, with electronic and microprocessor based gaming machines being more popular than ever. A brick and mortar gaming entity that provides gaming services, via stand-alone casino-type machines, may control gaming devices that are globally distributed in many different types of establishments. For example, gaming machines that are stand-alone units, may be placed in casinos, convenience stores, racetracks, supermarkets, bars and boats.

Brick and mortar gaming establishments typically use electronic and microprocessor based gaming machines can include various hardware and software components to provide a wide variety of game types and game playing capabilities, with such hardware and software components being generally well known in the art. For example, bill validators, coin acceptors, card readers, keypads, buttons, levers, touch screens, displays, coin hoppers, player tracking units and the like are examples of hardware that can be coupled to a gaming machine. Software components can include, for example, boot and initialization routines, various game play programs and subroutines, balance or credit, and payout routines, image and audio generation programs, security monitoring programs, authentication programs and a random number generator, among others. These software components are generally configured to provide these functions for a single gaming machine and each gaming machine typically duplicates the functionality of the other gaming machine in a brick and mortar casino.

In a typical, electronic and microprocessor based gaming machine operated by a brick and mortar casino, such as a slot machine, video poker machine, video keno machine or the like, a game play is initiated through a wager of money or credits that have been deposited directly into the gaming machine in some manner, whereupon the gaming machine determines a game outcome, presents the game outcome to the player and then potentially dispenses an award of some type, including a monetary award, depending upon the game outcome. In this instance, the gaming machine is operable to receive, store and dispense indicia of credit or cash as well as calculate a gaming outcome that could result in a large monetary award. The gaming machine is allowed to operate in this manner-because it is placed typically in location that is monitored (e.g., a casino), the gaming machine hardware and software components are secured within a locked cabinet and the gaming machine includes a security system for detecting fraud or theft attempts.

The functions available on a stand-alone, gaming machine may depend on whether the gaming machine is linked to other gaming devices. For instance, when connected to other remote gaming devices, a gaming machine may provide progressive jackpots, player tracking and loyalty points programs, cashless gaming, and bonusing among other items. Many of these added components, features and programs can involve the implementation of various back-end and/or networked systems, including more hardware and software elements, as is generally known. Nevertheless, the bulk of game play functionality on the gaming machine is provided via hardware and software located on the gaming machine.

Traditionally, as described in the previous paragraphs, casino-style gaming has been provided using self-contained devices, where each machine contains all of the hardware and software required provide a gaming experience, including generating game outcomes, providing a presentation of the game outcome and handling monetary transactions. More recently, client-server system architectures have been developed whereby one server can service the gaming requests, including game outcome generation, for multiple display devices. Although these client-server system architectures have applications in traditional brick and mortar gaming establishments, their major application so far has been in allowing the availability of casino-type gambling to expand via Internet based casinos.

In a client-server system architecture, the capabilities of the client and the tasks it is allowed to perform can vary depending on the location of the client. For instance, in a brick and mortar establishment, such as an Indian Casino, which are a secure location, slot-like gaming machines provide Class II games, such as bingo or lottery, where the gaming machines access a central server to obtain serialized, predetermined outcomes. These clients are operable to provide money handling transactions and generate presentation of the game outcome received from the server. These clients are very similar to the gaming machines traditionally used in brick and mortar gaming establishments and are often capable of providing local game outcome generation as well as receiving game outcomes from a remote server in the client server system architecture. Further, in a casino environment, a private and dedicated network is usually used to connect the client and server devices.

As noted above, Internet-based gaming is another example of a client-server system architecture and is an area where casino-style gaming is now being provided. In Internet-based gaming, the player's home computer or a mobile device, such as phone, contains the client software that interacts with a centralized online casino server. Since the client device is located in a non-secure environment, such as a player's home, the client device is used to provide only an interface that allows the player to view the game presentation and provide inputs, such as wager amounts or game inputs, that allow a wager-based game to be played.

In the example described in the preceding paragraph, the individual gaming transactions, accounting, player tracking, game outcome generation are handled by one or more the Internet casino servers. Further, the Internet casino servers are configured to provide functions that are usually not that important for brick and mortar casinos, such as player registration, which involves allowing new players to play games online, player account management, which involves electronically tracking a balance of funds in a players' account including transfers of funds in and out of the account, player verification, which involves determining whether a player is eligible to play games based-upon such factors as their age, location or credit worthiness and client software services, which provides software needed by the client to interact with the online casino and/or generate a game outcome. The software that allows the individual game transactions, player registration, player account management, player verification, accounting, game outcome and client software services is usually provided as a single integrated package, often referred to as casino platform software.

As compared to a brick and mortar gaming establishment, a gaming entity providing remote gaming services, such as an Internet-based casino, may provide gaming services to tens of thousands of or even hundreds of thousands of users/clients while a single land-based casino may include only thousands of gaming machines, which primarily operate as stand-alone devices. Further, an Internet-based casino interacts with clients that have hardware, software and communication capabilities that are much more variable from client to client as compared to a brick and mortar establishment. In a brick and mortar establishment, the gaming machines are much more homogenous and communications issues between a server and client are more reliable. In addition, because the security of the client and its location can't be relied upon, Internet-based casinos provide a much higher level of functionality in regards to player monetary account management and additional functions not generally provided by the stand-alone gaming devices of brick and mortar establishments, such as player registration and player verification.

In general, the client functionality is much greater in brick and mortar casinos as compared to the client functionality in Internet gaming. As a result, the gaming architecture in a brick and mortar casino can be considered a mostly distributed computing architecture while in an Internet casino the computing architecture can be considered a more centralized computing architecture. The differences in scale, functionality and computing architecture between brick and mortar casinos and Internet casinos lead to casino platform software packages executed on casino servers in Internet based gaming that are generally larger, more complicated and integrated than the server-based software packages utilized in a brick and mortar gaming establishments.

Player's gaming interests are constantly changing and the effort associated with providing fresh content to users is quite costly. However, most online casinos offer games solely developed by the company that provides their casino platform software and are unable to provide games developed by other software providers. The ability of a casino operator to maximize their operating profits and keep their customers happy is directly linked to their ability to provide new and desirable gaming content. In view of the above, it would be desirable to provide gaming apparatus and method that reduce the costs associated with providing new gaming content, such as new games, on gaming devices, such as remote gaming clients served by an Internet-based casino server.

SUMMARY

The present invention addresses the need describe above by providing a gaming system including a game outcome server, a player management server and at least one gaming device communicatively coupled via a network. The game outcome server may be operable to download a gaming application for a wager-based game of chance to the gaming device, generate a game outcome for the game of chance that is displayed on the gaming device and provide information that allows a player's account on the player management server to be updated. In a particular embodiment, the player management server is operable to provide gaming services related to remote wager-based game play on the gaming device including but not limited to a) web-site hosting for a web-site listing gaming services, b) accounting, c) money handling and d) player eligibility functions. In a particular embodiment, as a result of a physical separation between components in the gaming system, a portion of the communications between the game outcome server, the player management server and the gaming device may be over a wide area network, such as the Internet. In another embodiment, the game outcome server may provide gaming services simultaneously to a plurality of first gaming devices associated with a first player management server and to a plurality of second gaming devices with a second player management server.

To provide a wager-based game displayed on the gaming device, the gaming device may access a web-site listing gaming services hosted by the player management server. The web-site may include one or more links to the game outcome server. Following a selection of a link to the player management server, an authentication process may be initiated between the game outcome server and the player management server. During the authentication process, the game outcome server and the player managment server may exchange information that allows i) the verification of eligibility of the gaming device and ii) allows the verification of the player management server to receive gaming services from the game outcome server and iii) uniquely identifies a game play session initiated on the gaming device.

Upon a successful authentication, player account information, such as balance information and player preferences, may be sent from the player management server to the game outcome server. When the player has enough available balance and a game has been initiated on the gaming device including a wager, the game outcome server may generate a game outcome that is displayed on the gaming device. The game outcome may be displayed as a game presentation, such as reels, spinning and stopping for a slot game. Also, an award associated with the game outcome may be displayed with game presentation. In addition, the game outcome and associated award may communicated in a manner that allows a balance associated with a player's account maintained on the player management server to be updated.

In a particular embodiment, the game outcome server may receive a request for a game and a wager amount for the game from a gaming device and may generate a tentative game outcome for the game. Then, the game outcome server may communicate to the player management server the wager amount and the effect of the tentative game outcome on the player's balance. If the player's balance is large enough to support the wager amount for game, the player management server updates the player's balance and responds to the game outcome server that the transaction is valid. The game outcome server then at least transmits the game outcome to the gaming device. When the player's balance is not large enough to support the wager, the player management server may send a message with information indicating the wager is not valid to the game outcome server and may optionally send a message to the client. In response to receiving the message from the player management server, the game outcome server may disregard the tentative game outcome and may send a message for display on the gaming device indicating the wager is not valid.

In another embodiment, the game outcome server may receive a request for a game and a wager amount for the game from a gaming device and may generate a tentative game outcome and in parallel contact the remote server to authorize the wager. After the tentative game outcome and authorizing acknowledgement from the game outcome server arrives, the game outcome server may communicate information to the gaming device that allows the game outcome to be presented on the gaming device. The presentation for the game outcome may include an update to the player's balance.

In another embodiment, the game outcome server may maintain a temporary balance for a player. The temporary balance may result from a transfer of funds from an account maintained on a balance handling device, such as a player management server/system, a player tracking system or a casino gaming machine. As a result of gaming activities generated on the game outcome server, such as a play of one or more games, the game outcome server may be operable to increase or decrease the temporary balance depending on an award associated with each gaming activity. As long as funds remain in the temporary balance, the game outcome server may not have to contact the balance handling device from which the funds were transferred each time a gaming activity that may affect the temporary balance is initiated by the play via a client device.

The game outcome server, in response to a) a request received from a client device, b) a request received from a balance handling device, such as a player management server, a player tracking system or a casino gaming machine, c) an event initiated on the game outcome server, such as after a time period expiring, may be operable to transfer any remaining funds in the temporary balance back to the balance handling device. In addition, when the funds remaining a temporary balance are exhausted, the balance handling device, such as a player management server, a casino gaming machine or a player tracking system and/or the game outcome server may be operable to initiated a transfer of funds from the balance handling device to the game outcome server that allows the temporary balance maintained on the game outcome server to be supplemented. The additional funds may allow for further gaming activities to be generated on the game outcome server and displayed on a client device in communication with the game outcome server.

In addition to providing information to the client device, the game outcome server may also transmit a request to update a player's balance to the player management server. In response, the player management server may update the player's balance and may send an acknowledgement that the player's balance has been udpdated. After receiving the acknowledgement, the game outcome server may store a record of the transaction on the game outcome server. Further, for any of the purposes of auditing and dispute resolution purposes billing, performance analysis, etc., a record of the game outcome may be stored on the game outcome server and/or the player management server.

Alternately, when the player management server responds that the player's balance is insufficient, the game outcome server may disregard the tentative game outcome and send a message for display on the game client device indicating that the player doesn't have sufficient funds to proceed with the requested game. If available (i.e., when it has been received from the remote host), the game outcome server may provide information to the gaming device indicating the player's current balance. A record of the failed game may or may not be stored on the game outcome server and/or the player management server.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media.

Aspects of the invention may be implemented by networked gaming machines, game servers and other such devices. These and other features and benefits of aspects of the invention will be described in more detail below with reference to the associated drawings. In addition, other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods for providing game services to remote clients. These drawings in no way limit any changes in form and detail that may be made to the invention by one skilled in the art without departing from the spirit and scope of the invention.

DETAILED DESCRIPTION

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

Although the present invention is directed primarily to gaming machines and systems, it is worth noting that some of the apparatuses, systems and methods disclosed herein might be adaptable for use in other types of devices, systems or environments, as applicable, such that their use is not restricted exclusively to gaming machines and contexts. Such other adaptations may become readily apparent upon review of the inventive apparatuses, systems and methods illustrated and discussed herein.

Figure 1:
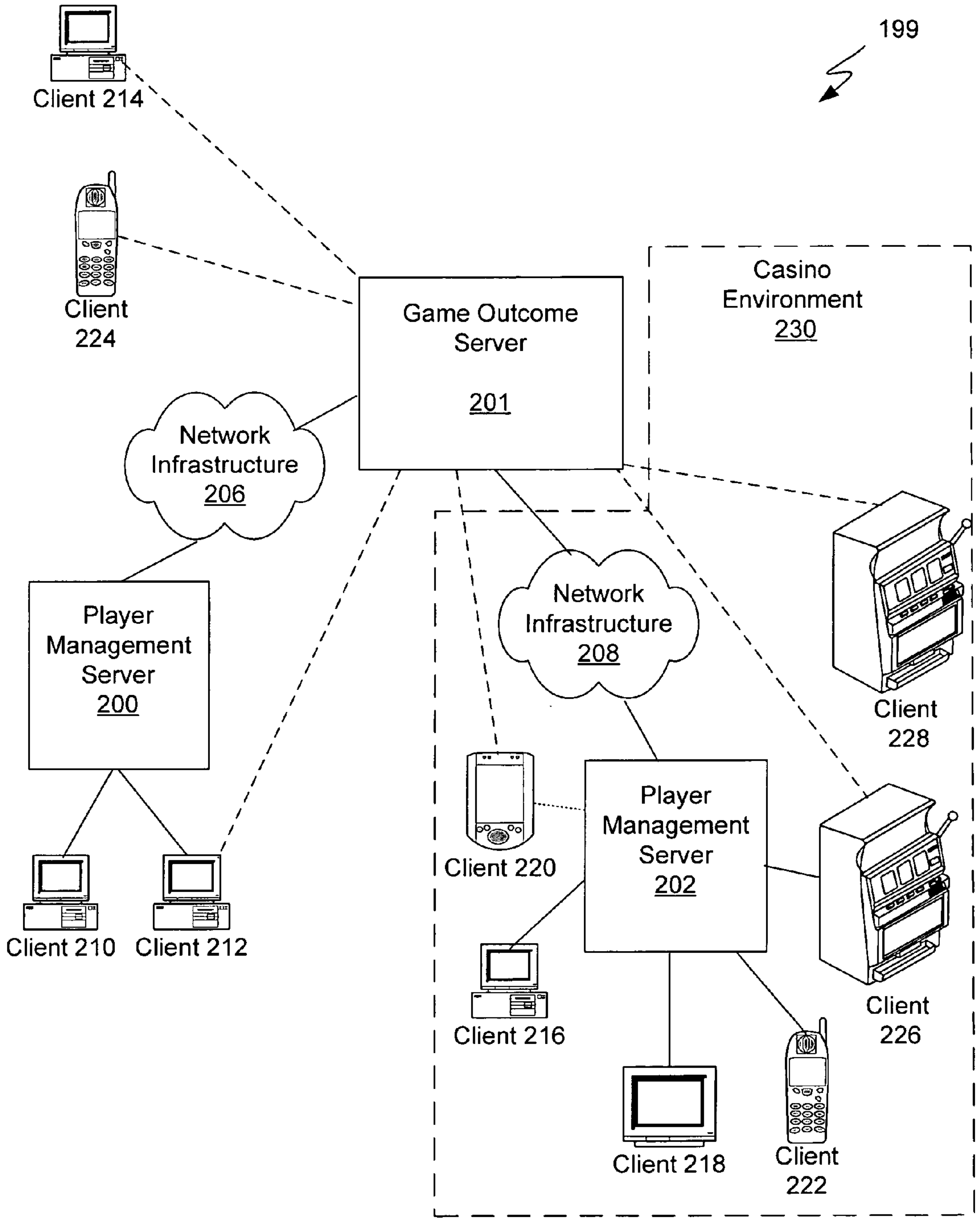
FIG. 1 illustrates a block diagram of a gaming system of the present invention.

FIG. 1 illustrates a block diagram of a gaming system 199 for one embodiment of the present invention. The gaming system 199 may provide wager-based gaming services on a number of different clients. The gaming system 199 may comprise a game outcome server 201, player management servers 200 and 202, network infrastructure, such as 206 and 208, and clients 210, 212, 214, 216, 218, 220, 222, 224, 226 and 228. Further details of a server, such as servers 200, 201 or 202, that may be utilized with embodiments of the present invention are described with respect to FIG. 7.

The clients in the gaming system 199 provide an interface that allows a user to participate in a game. The game may be a game of chance or a game of skill and may include wagering on an outcome of the game. To provide the interface, the client may at least include a display device for viewing the game and input mechanism for making choices related to the play of a game. For example, the input mechanism may allow a player to select a wager amount, initiate a game, select paylines, hold/draw cards, select a game, etc. Some examples of input mechanisms include but are not limited to a mouse, keyboard, buttons on a button panel and a touch screen. Further details of peripheral devices and functionality that may be provided with a client or a server are described with at least respect to FIGS. 2-7.

Many different types of clients may be used in the gaming system 200. Some examples of clients include but are not limited to personal computers, 210, 212 and 214, cell phones 222 and 224, a tablet computer 218, a PDA 220, casino-type gaming machines 226 and 228 and a television set-top box 216. During game play, the clients may be located in a monitored and relatively secure environment, such as a casino environment 230, or in an unmonitored environment, such as a user's home. The casino environment 230 may include locations associated with a casino where game play is allowed. Nevertheless, the clients of the present invention may be used in other environments, such as stores, restaurants, bars, racetracks, sports books and other venues where game play is allowed.

The network infrastructure, such as but not limited to 206 and 208, that allow the clients and servers to communicate with one another may comprise various combinations of wireless and wired communication links. Also, various wireless and wired communication protocols may be employed over these links as is appropriate for the devices that are communicating and the type of communication link that is being utilized for the communication. The protocols that are utilized may be of a proprietary or non-proprietary nature. The network infrastructures 206 and 208 may utilize communication links provided by wide-area networks, such as the Internet, a wide area progressive jackpot network, a Wi-Fi network or a cell phone network and/or local area networks, such as a communication schema provided within a casino.

In one embodiment, the player management servers 200 and 202 may allow a remote client to provide game play of games where a monetary balance is adjusted based upon the outcome of the game. To enable the game play, the player management servers, 200 and 202, may be operable to provide an account with a balance of funds that a player may use to play games. As part of the account management, the player management servers may be operable to allow funds to be deposited and transferred from the account. In a particular embodiment, the transfers of funds into and out of the account may be performed electronically. The electronic fund transfers may involve credit cards, debit cards, bank accounts, wire transfers, etc. Other types of fund transfers, such as via paper check, may also be employed. The player management servers, 200 and 202, may manage accounts for thousands or tens of thousands of players and may be capable of providing game play for thousands of player's simultaneously.

When a player doesn't have an existing account with the player management servers, such as 200 or 202, then the player management server may be operable to establish a new account with the player. The registration process may include functions, such as but not limited to determining that a player is eligible to play by checking their location, age, financial institution, credit, details about the device being used, etc. Once a player's eligibility to play is verified, an account for the player may be set-up. The account set-up may include but is not limited to player information, device information, financial information and a verification mechanism, such as a password, player biometric details, PIN number, hardware details or combinations thereof. After funds have been established in the account, a game play session utilizing the funds in the account may be initialized. In some embodiments, the player management servers, 200 and 202, may carry out a verification process each time a player tries to access their account. Details of a verification process that may be used with the present invention are described in co-pending U.S. application Ser. No. 11/039,065, filed on Jan. 18, 2005, by Mathews, et al., and titled, "Configurable and Stand-alone Verification Module," which is incorporated by reference herein in its entirety and for all purposes.

After a player accesses their account on one of the player management servers, such as 200 and 202, via a client device, game play may begin. In one embodiment, the player management servers, 200 and 202, may host a web-site that provides a portal that allows the player e to access their account and to play games. During game play, the player management servers, 200 and 202, may maintain and update a player's balance in their account as a result of their gaming activities. Gaming activities may include but are not limited to sports wagering or wagering on other types of events, playing games of chance, such as slot games, card games (e.g., poker and blackjack), roulette games, bingo games, lottery games, keno games, or dice games, and playing games of skill, such as solitaire. Further details of providing gaming services that may be used in the present invention are described in co-pending U.S. patent applications 20040242322, titled "Flexible User Interface," filed Dec. 15, 2003 by Montagna, et al., 20040152511, titled "Cross-Enterprise Gaming Server," filed Sep. 23, 2003, by Nicely, et al., and 20050176500, titled, "Configurable and Stand-Alone Verification Module," filed Jan. 18, 2005, by Mathews, et al., each of which is incorporated herein by reference in its entirety and for all purposes.

The player management servers, 200 and 202, may be operable to allow a number of gaming activities to occur simultaneously that may affect a player's balance tracked by the player management server. For instance, a player may be playing two or more games of chance simultaneously via an interface on a client device. In another example, a player may be making sports wagers that decrease a player's balance or receiving the results of sports wagers that may increase a player's balance while playing a game of chance or other type of game that may increase or decrease their balance depending on the outcome to the game via an interface on a client device.

Traditionally, Internet casinos have used a centralized, integrated software architecture to provide gaming activities, such as a casino software platform that may include a combination of player account management, player registration, player tracking, money handling, player verification, client software management and game services (e.g., generating game outcome and associated presentations and storing a record of game play dispute resolution purposes). Different software providers provide different casino software platforms where each software provider may use different software implementations to generate the functions described above. Associated with each casino software platform is a unique set of games that are only compatible with casino software platform provided by the software provider of the casino software platform.

As an example of utilizing casino software platforms, provided for illustrative purposes only, player management server 200 may be installed with a first casino software platform from a first casino software provider that provides a first set of games and player management server 202 may be installed with a second casino software platform from a second casino software provider that provides a second set of games. In one embodiment, player management server 200 may be a first Internet Casino and player management server 202 may be a second Internet Casino. In operation, each of the player management servers, 200 and 202, utilizing the integrated casino software platforms may have unique customer database, unique player management functions/capabilities and a unique set of games associated with each integrated casino software platform. An advantage of an integrated casino software platform is that an operator may install one of the packages on a server and have an online casino up and running.

As noted previous paragraph, each integrated casino software platform is associated with a unique set of games. The provider of the integrated casino software platform may update the games that are available for their platform. However, a game developed for a first casino software platform by a first software provider is generally not compatible with a second casino software platform. Thus, if an operator desires access to a popular game from a first casino software platform provider and already is set-up with a casino software platform from a second casino software platform provider, then, to obtain access to the popular game, the operator is limited to either 1) setting up a new server with the first casino software platform that provides the popular game or 2) forgoing the popular game, and utilizing only the games provided by the second casino platform software provider. In the case, where the operator decides to set up the new server with the first casino software platform including the popular game, the operator has to worry about maintaining two different casino software platform packages, porting account information to the new casino software platform and compatibility issues between the two casino software platforms.

One solution to the problem described in the previous paragraph, as identified herein, is to provide method and apparatus for game services that are compatible with multiple casino software platforms. The method and apparatus may include a game outcome server, such as 201, that provides game services that are compatible with different integrated casino software platforms. For example, in one embodiment of the present invention, player management server 200 may utilize, a first casino software platform and player management server 202 may utilize, a second casino software platform. Again, a unique set of games may be native to each platform. Player management server 200 may provide a remotely accessible interface, such as a but not limited to web-site, that provides first content, such as text or images, related to the games native to the first casino software platform and second content, such as text or images, related to the games provided by game outcome server 201. Similarly, player management server 202 may provide a remotely accessible interface, such as but not limited to a web-site, that provides third content, such as text or images, related to the games native to the second casino software platform and fourth content, such as text or images, related to the games provided by game outcome server 201.

In a particular embodiment, the first content, second content, third content and fourth content, may each include selectable links, such that when the player management server 200 or 202 receives information from a client that one of the links is selected, a process for providing a play of a selected game corresponding to one of the links is initiated. The method of providing the play of the selected game may differ depending on whether the selected game is native to the casino software platform of player management server 200, the selected game is native to the casino software platform of player management 202 or the selected game is provided by game outcome server 201 as will be described as follows in regards to various embodiments of the present invention.

In particular embodiments, when player management server 200 receives information indicating that a link that is associated with a game generated by the game outcome server is selected, then an interaction between the player management server 200, the game outcome server and a first client device may be initiated (The first client device and the player management server 200 have already initiated a communication session at this point and a verification process may have already occurred involving the first client device and the player management server 200). The selected link may be represented by the second content, described in the above paragraphs, generated on the remotely accessible interface provided by the player management server 200. Similarly, when the player management server 202 receives information indicating that a link that associated with a game generated by the game outcome server 201 is selected, then an interaction between the player management server 202, the game outcome server 201 and a second client device may be initiated. The selected link may be represented by the fourth content, described in the above paragraphs, generated on the remotely accessible interface provided by the player management server 202. The game outcome server 201 may be operable to interact with player management server 200, player management server 202 and a number of client devices simultaneously, such as but not limited to the first client device and the second client device. Details of these interactions are described as follows.

In particular embodiments, the links to games generated by the game outcome server 201 on player management server 200 and the links to games provided by game outcome server 201 on player management server 202 may be links to the same or different games as determined via agreements between the operator of the player management server 200 and the operator of the game outcome server 201 and agreements between the operator of the player management server 202 and the game outcome server 201.

A game generated by the game outcome server 201 may be customized in some manner for a particular player management server, such as 200 or 202. Thus, the player management servers, 200 and 202, may each provide a link to a similar game on the game outcome server 201 that differs by the customization generated for each player management server 200 and 202. In a particular embodiment, the customization may be as simple as incorporating a name or a logo associated with each of the player management servers, 200 and 202, to differentiate game. In general, when a communication session is initiated between a player management server, such as 200 and 202, the game outcome server 201 may be operable to receive information, such as but not limited to text or a logo, from the player management server that allows the game outcome server to customize games provided to clients of the player management server. The customization information may be incorporated into the game outcome presentation associated with a particular game.

The games identified by the links may be varied in time and/or customized according to the player. In one embodiment, the player management servers, 200 and 202, may be operable to vary the links according to some defined criterion or criteria, such as according to a time of day, in response to a player's game playing history or in response to some other information known about the player. In another embodiment, the player management servers, such as 200 and 202, may be operable to allow the game outcome server 201 to control or affect content presented on a portion of the remote interface for a client that the player management servers, 200 and 202, each generate that includes the links to the games on the game outcome server 201. Thus, the game outcome server 201 may include logic that allows the links to games provided on the remote interfaces of the player management servers, 200 and 202 to be modified by the game outcome server 201.

When the game outcome server 201 is allowed to affect the content related to the game links to itself on a player management server, 200 and 202, the method and criteria the game outcome server 201 uses to select the game links to present on the player management server, such as 200 and 202, may depend on how much information the player management server shares with the game outcome server 201. In some embodiments, the player management server, such as 200 and 202, may share information about the player and the game outcome server 201 may utilize the shared player information to select game links. The shared player information may be general enough so that the player remains anonymous, such as a player's age, sex, birthday, city where they live, playing preferences, such as games they have played before, etc. In other embodiments, the player management servers may not share any player information with the game outcome server and the game outcome server may be operable to select game links and affect the content presented on the remote interface without using player information. For instance, the game outcome server may use calendar information, such as time of day, time of year, season, holiday information, etc., to select game links to present on the interface provided by the player management server, such as 200 or 202.

In a particular embodiment, the player management servers, 200 and 202, don't have to provide any native or locally generated games associated with a casino software platform. The player management servers may only perform player management functions, such as account management or player verification. The game services may be provided via links to one or more games provided by one or more game outcome servers, such as game outcome server 201. Further, in one embodiment, the game outcome server 201 may only provide games and not any player management functions. In another embodiment, the game outcome server 201 may provide player management functions and game services for a first group of game players and only game services for a second group of game players where the player management functions are provided by another device, such as the player management servers, 200 and 202. In yet another embodiment, the game outcome server 201 may provide a portion of the player management functions, such as player verification, and game services while the rest of the player management functions are handled by another device, such as the player management servers, 200 and 202.

In one embodiment, the game outcome server 201 may be operable to provide games where a player's balance is maintained on a device remote from the game outcome server 201. The player's balance may be used in association with the games generated on the game outcome server 201, such as to make wagers on an outcome of a game. Thus, methods and apparatus may be utilized that allows the remote device and the game outcome to confirm that the player has an adequate balance to perform a desired action via the game outcome server, such as make a wager. In addition, information generated on the game outcome server 201 may affect the player's balance maintained on the remote device. Thus, method and apparatus may be utilized that allow the balance on the remote device to be updated in response to event generated on the game outcome server 201, such as an award amount corresponding to a game outcome generated on the game outcome server 201.

In some instances, games played on the game outcome server may not affect a player's balance and a balance on a remote device may not have to be updated. For example, the game outcome server may provide the play of games for free with simulated wagers. In which case, the game outcome server may provide the play of a game but the player's balance is not affected.

When the game outcome server doesn't maintain a player's balance, the remote device that maintains a player's balance may be a player management server, such as 200 and 202, or a slot machine, such as 226 and 228. In general, any device or system that is operable to maintain a player's balance, may be utilized with a game outcome server in this embodiment. Further, details of method and apparatus that may be utilized with this embodiment are described with respect to FIGS. 2-7.

Returning to FIG. 1, on the client interface, which may vary from device to device, in one embodiment, in at least a first portion of a display associated with the client interface, one or more game links that lead to game outcome server 201 may be provided when the client device is in communication with one of the player management servers, 200 and 202. After one of the player management servers, 200 and 202, receives information indicating one of the game links has been selected that corresponds to a game provided the game outcome server 201, the player management server may send information to the game outcome server 201 that allows the game outcome server 201 to establish a communication link with the client device. When the selected game link is for a game that is provided natively on the player management server, such as 200 or 202, then there is no need to establish a communication link between the game outcome server 201 and the client device.

In various embodiments, the information sent form the player management 200 server to the game outcome server that allows the game outcome server 201 to establish a communication link with the client device may include but is not limited to one or more of the following: a game identifier, an identifier associated with the message sender, a unique player identifier such as a number or a name, the player's stated country of residence, other player registration information such as language, player balance, player currency, and other information concerning the player's account used in customizing the game provided by the game outcome server 201 or combinations thereof. The player management server 200 may also send security credentials to the game outcome server 201 to authenticate that request as being from an authorized system. The game outcome server 201 may store information regarding authorized systems from which it may receive a player referral and balance information, such that its security credentials may be verified.

After the communication link with the client device is established, the game outcome server 201 may provide information to the client device that alters the client interface in some manner. For example, in one embodiment, a window may pop-up, on the client interface that provides a portal to the game outcome server 201. Next, the game outcome server 201 may be operable to provide a gaming application to a client, via a download if necessary, that allows a wager-based game to be played on the client. In some instances, a download may not be necessary because the gaming application may already reside on the client. As part of the communication between the client and the game outcome server 201, the game outcome server may request information from the client to determine whether the gaming application is already resident on the client.

In particular embodiments, the gaming application may be configured to allow the client to establish a gaming session where a game is played on the client. During the gaming session, the gaming application may send information regarding inputs made on the client and in response receive commands, instructions, data or combinations thereof, from the game outcome server 201 that allow the game outcome server to affect a presentation of the game on the client. The presentation may correspond to the game outcome generated on the game outcome server 201 in response to a wager, such as the game outcome to a slot game (final position of slot reels) and any awards associated with the game outcome. In one embodiment, the game outcome server 201 may not maintain a player's balance information. Thus, prior to presenting the game outcome on the client, the game outcome server 201 may need approval from a device that may maintain a player's balance, such from a player management server, such as 200 and 202 or from a slot machine or other money-handling capable device, that the player's wager is valid, i.e., the player has sufficient funds for the requested gaming activity provided by the game outcome server 201.

Figure 4A:
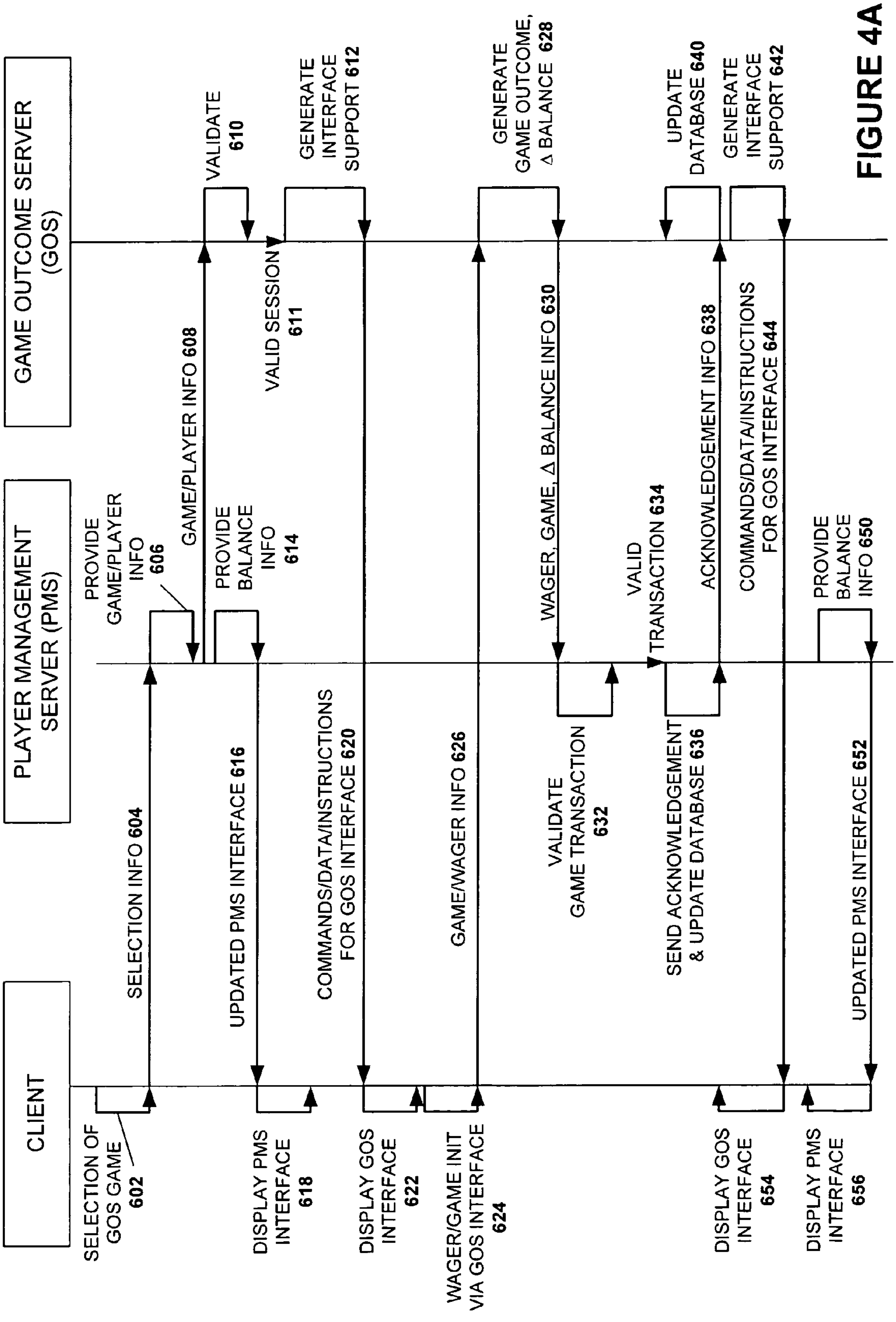
FIGS. 4A-4B are interaction diagrams illustrating transactions between a game outcome server, a player management server and a client for embodiments of the present invention.
Figure 4B:
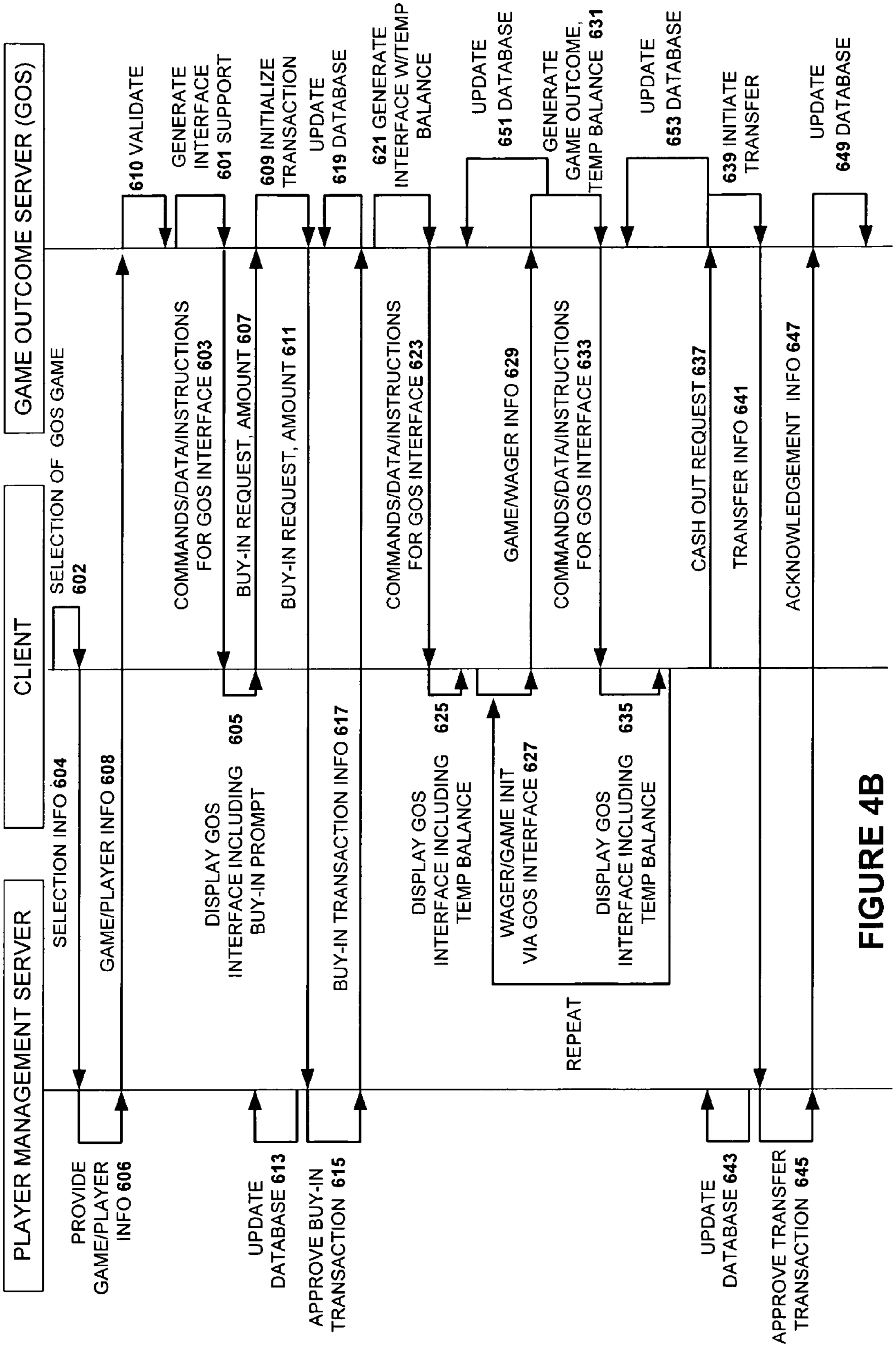

In another embodiment, as is described in more detail with respect to FIG. 4B, a client via the game outcome server 201 may be operable to request a transfer of funds from a player management server 200 to the game outcome server 201 or a client via the player management server 200 may be operable to a request a transfer of funds from the player management server 200 to the game outcome server 201. After the funds are transferred to the game outcome server 201, via the client, a player may play a series of games on the game outcome server 201 with the transferred funds. Using the transferred funds, the game outcome server 201 may not need to get approval from the player management server 200 each time a game is played as long as a current balance of the transferred funds is sufficient to cover a player's requested gaming activity.

In the embodiment described above, the game outcome server 201 may maintain a temporary balance of the transferred funds. As a result of gaming activities generated on the game outcome server 201, a balance of the transferred funds may be increased or decreased depending on an award associated with each gaming activity. The game outcome server 201, in response to a) a request received from the client device, b) a request received from the player management server or c) an event initiated on the game outcome server, such as after a time period expiring, may be operable to transfer any remaining funds in the temporary balance back to the player management server 201. In addition, when the funds remaining a temporary balance are exhausted, the player management server 200 and/or the game outcome server 201 may be operable to initiated a transfer of funds from the player management server 200 to the game outcome server 201 that allows the temporary balance maintained on the game outcome server to be supplemented to allow for additional gaming activities provided by the game outcome server 201.

The gaming application may be based-upon proprietary custom software, may be based on a non-proprietary software environment, such as an Adobe Flash,™ of combinations thereof. For instance, in one embodiment, the game outcome server 201 may be operable to download a Flash-based gaming application comprising a plurality of Flash-based movies that allows a wager-based game to be played on any of the types of clients in FIG. 1. The client may include a media player that is compatible with the Flash based movies. In particular embodiments, the contents of the Flash-based gaming application may be tailored by the game outcome server 201 according to the hardware capabilities of the client device receiving the application. Thus, a home computer, such as 210, may receive a different application then a cell phone, such as 222.

In another embodiment, the game outcome server 201 may be operable to stream a game outcome presentation to any of the types of clients in FIG. 1. In video streaming, the video frames of a game outcome presentation may be generated on the game outcome server 201 and then transmitted for display on the client. The game outcome server 201 may be operable to adjust the frames, such as size, resolution, frame rate, etc., to account for the display capabilities of the client receiving the video frames.

The multimedia player and associated files, such as the Flash Player™ may be a component of a "Rich Internet Application," (RIA). Rich Internet applications (RIA) are typically interface applications provided by a host to a client with downloadable components that have the features and the functionality of locally installed and executed programs. RIAs typically transfer the processing necessary for the interface generated by the application to the client but keep the bulk of the data (i.e., maintaining the state of the program, the data etc) back on the host. RIA's are not limited to web-based applications applied over the Internet and may be utilized in other network architectures. In an RIA involving a host device and a client device (e.g., the game outcome server 201 may be considered a "host" and gaming devices, 210, 212, 214 and 224 may be considered a "clients" in particular embodiments), an application for generating an interface executed on the client may be operable to perform functions independently of the host, such as computations, send and retrieve data in the background, store data locally, redraw sections of the screen, and/or use audio and video in an integrated manner, etc.

In particular embodiments, the game outcome server 201 may download a gaming application to the casino-type gaming machine 228 where the gaming application is executed on the gaming machine. In another example, the game outcome server may be operable to stream video for a game of chance to the personal computer 212 where the video is displayed on client 212. In yet another example, the client 220 may be a portable wireless game device that is operable to receive gaming services from the game outcome server 201. In a casino environment 230, the portable wireless gaming device may be utilized in certain restricted areas associated with a casino, such as around a pool.

In general, the clients may be operable to execute gaming applications, such as Flash-based games, games configured for other compatible media player or customized gaming application software, and/or receive video streams that are displayed on the client. Further, the clients may be operable to provide game play of multiple games at the same time. For instance, a client may be operable to communicate with multiple game outcome servers at the same time and provide game play for different games available on each of the game outcome servers at the same time.

In another embodiment, the client may be operable to provide a game play of multiple games at the same time via a single game outcome sever 201. For instance, the client may be simultaneously connected to the game outcome sever 201 via two separate gaming sessions on each of player management servers, 200 and 202. As another example, in a single gaming session, such as initiated through one of the player management servers, the game outcome server 201, may allow the client to open up multiple windows where the same game or different games may be played in each window.

As previously noted, the game outcome server 201 may connect to and provide gaming services to multiple clients simultaneously. The clients may be associated with different player management servers, such as 200 and 202. For instance, the game outcome server 201 may be in communication with clients 214, 224 and 220 simultaneously allowing a slot game to be played on client 214, a card game to be played on client 224 and a bingo or keno game to be played on client 220. As noted above, each of these clients, 214, 224 and 220, may be operated in different locations by different users, wherein the devices may be connected to the player management servers, such as 200 and 202, and game outcome server, 201, using different network communications paths.

In some embodiments, the client may include native capabilities that allow a game outcome for a gaming application downloaded from the server 201 to be generated on the client. For instance, one of the stand-alone casino-type gaming machines 226 and 228 may receive a download of a gaming application from game outcome server 201, such as a Flash-based application, that generates a card game on the client and execute the gaming application. To display a game outcome and award for a play of the card game, the gaming application may utilize random number generation capabilities and money handling capabilities native on the clients 226 and 228 to generate and to display an outcome to the card game on the client. Further, in this embodiment, the balance is maintained on the gaming machine only for the player currently playing the gaming machine. Thus, some of the player management functions generally provided by a player management server may not be needed.

Details of interactions between a gaming machine and a game outcome servers that may be utilized in the present invention are described in co-pending U.S. application Ser. No. 11/595,798, filed on Nov. 10, 2006, naming Little, et al. as inventors, and titled, "REMOTE CONTENT MANAGEMENT AND RESOURCE SHARING ON A GAMING MACHINE AND METHOD OF IMPLEMENTING SAME," and U.S. application Ser. No. 11/595,774, filed on Nov. 10, 2006, naming LeMay, et al. as inventors, and titled, "METHOD AND APPARATUS FOR INTEGRATING REMOTELY-HOSTED AND LOCALLY RENDERED CONTENT ON A GAMING DEVICE," each of which is incorporated herein by reference and for all purposes During game play on the client, the game outcome server 201 may be configured to maintain a current state of the game during game play. Thus, when the game is being played on a client and a connection is lost between the server 201 and the client during game play, the client and/or the game outcome server 201 may be operable reestablish a link with the game outcome server 201 and under control of the server, the client may be restored to state in the game prior to when the connection was lost. For example, during a card game played on the client, if a connection was lost while the cards where being dealt or after the cards had been dealt but prior to the player selecting cards to hold, then the game outcome server 201, after reestablishing communications with the client, may provide information to the client that allows the same cards to be dealt again and displayed or just displayed again. The game outcome server 201 may also direct the client to display the balance and wager information that was displayed on the client prior to the connection being lost.

In one embodiment, the game outcome server 201, may have generated a tentative game outcome for the client, received an approval message from the player management server, such as 200 and 202, that the player management server, 200 or 202, that the gaming transaction is approved and then lose a connection with the client prior to the display of the game outcome. Then, the game outcome server 201 may try to reestablish communications with the client device for a specified time period. When the time period expires, the game outcome server 201 may or may not save information that allows the approved game outcome to be displayed on the client. In another embodiment, the approved game outcome may be stored on the player management server, such as 200 and 202, and when the player is able to establish communications with the player management server via the client that was utilized when the connection was lost or via another client, then the player may be able to view on the client limited information about the last game outcome recorded, such as how their balance was affected by the last game outcome.

In some embodiments, the client may have state maintenance capabilities separate from the server 201. For example, the client may store a record of game information received from the server 201 or non-critical not related to the game outcome. When the client is restored to a previous state after communications are reestablished between the server and the client, the information on the client may be used by server 201 and/or client to verify that the correct game is being restored and the client is in the proper state. For example, state information stored on secure client, such as casino-type gaming machine 226 and 228, may be compared with state information stored on the server 201 when a state of a game is restored on the client.

In one embodiment, the game outcome server 201 may generate game play on the client while an active communication session is maintained between the client and the game outcome server 201. Thus, messages may be exchanged regularly between the game outcome server 201 and the client that allows the game outcome server 201 to determine that the communication session is active. In some embodiments, when the communication session becomes inactive between the game outcome server 201 and client, an initialization process, such as a login and verification process, between the client and game outcome server 201 may have to be repeated to allow game play to continue on the client.

In another embodiment, after the player initiates a game session on a client and after they go through a successful verification process, then a gaming session initiated on the client may be valid for a time period. During the time period for which the verification is valid, a number of gaming sessions may be initiated and terminated from the client without a repeat of the verification process. In yet another embodiment, the successful verification may be valid for a number of gaming sessions on the client in a time period or just a number of gaming sessions before the verification is required to be repeated.

In other embodiments, the game outcome server 201 may provide gaming services that allow game play to continue on the client without an active communication session. For instance, for a client with random number generation and money handling capabilities, such as a slot machine, the game outcome server 201 may provide a gaming application to the client and then end communications with the client. The client may then be operable to generate game outcomes and provide input to the gaming application in a stand-alone manner.

In yet another embodiment, the game outcome server 201 may provide a gaming application and game outcomes for a plurality of games to a client. For instance, via the client, a request for 10 plays of a game with a wager amount for each game may be made to the game outcome server 201. The game outcome server 201 may generate the game outcomes for all ten games and determine a final adjustment to the player's account as a result of the ten games where each of the games may have provide a positive or a negative adjustment to the player's balance. An approval for the play of the ten games may be sent from the game outcome server 201 to one of the player management servers, such as 200 or 202. When the play of the batch of games is approved, the game outcome server may send information to the client that allows the games to be viewed in sequence or in an order determined via inputs made at the client. The gaming application and the game outcomes may allow the plurality of games to be played on the client at a pace determined by a user of the client without additional communications from the game outcome server 201. When the plurality of game outcomes are exhausted, the client may contact the game outcome server 201 and request additional game outcomes to continue game play. This capability may be valuable to a player that is paying for their connection time, such as a connection via a cell phone, because it may minimize the amount of connection time that is utilized on the client.

After a game outcome for a wager-based game is generated on the game outcome server 201, the game outcome, award information, player information, client information, wager information, time information, session information and other game related information may be stored on the game outcome server 201 as a game history record. In one embodiment, the game history record may be stored in a database in a manner that allows a player to later locate and view a record of their past game play. For a player, past game play may span game play on different clients. In another embodiment, a game operator may only have access to search game history records. At the request of a player, the game operator may retrieve the requested game history records and provide them to the player.

In a manner similar to the state information, game history records may be mirrored on the client. The game history records stored on the client may include a subset or a superset of information as compared to the game history records stored on the server 201. For example, clients, such as gaming machines 226 and 228, which are described with more detail with respect to FIGS. 5 and 6, typically store game history records of games played. Again, the duplicate records may be used for auditing and verification purposes.

To play a wager-based game on a client, jurisdictional rules, such as age limits, locations where games can be played, types of games that can be played and wagering rules that are established by a gaming jurisdiction may need to be enforced. In a "brick and mortar" gaming establishment, such as casino environment 230, the operator of the gaming devices (i.e., clients) and the manufacturers of gaming devices are typically responsible for enforcement of jurisdictional rules in the gaming jurisdiction where the gaming establishment is located and hence the location where the clients are utilized. In an Internet casino environment, the enforcement of jurisdictional rules is left up to the provider of the gaming services. These jurisdictional rules may depend on where a remote server, such as 200, 201 and 202, is located as well as a location where the client is physically located.

Further, to allow for wagering, a method for receiving cash from a player and dispensing cash to a player needs to be established. In a casino environment 230, the casino-type gaming machines, 226 and 228, are configured with money handling capabilities and cash or indicia of credits may be input and dispensed from the gaming machines. Thus, a player may use the gaming machines anonymously without having to establish an account with the casino. Although, for players with an account recognized by the casino, it may be possible to electronically transfer funds directly to the client, such as 226 and 228. For clients without money handling capabilities or for devices located in an environment that is deemed non-secure, an account may be established for a user that allows the user to maintain funds for wagering. As wager-based game is played, wins and losses from the wager-based game may be reflected in the account balance.

Figure 2:
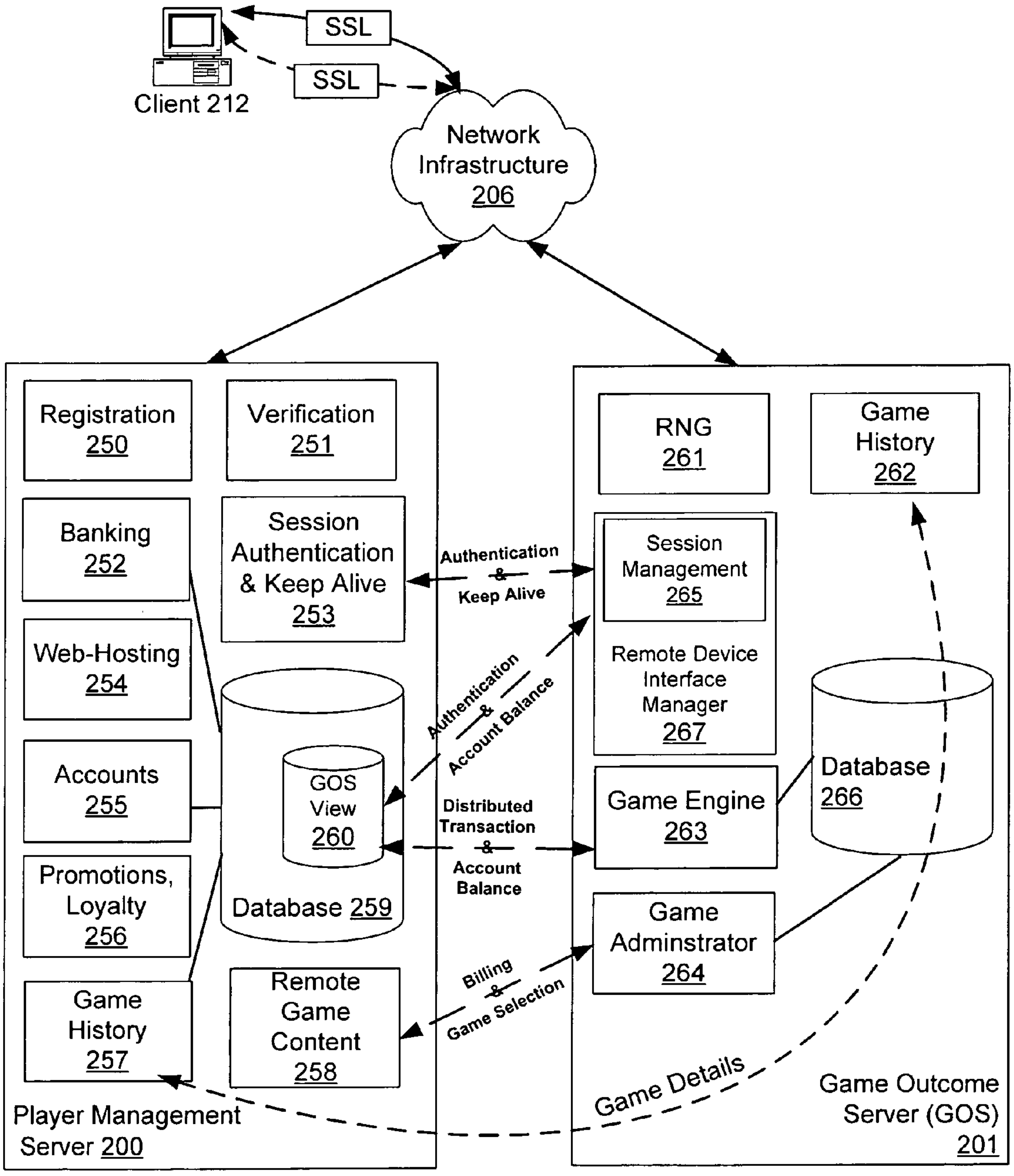
FIG. 2 is a block diagram showing details of interactions between a client, a player management server and a game outcome server and components of these gaming devices for one embodiment of the present invention.

FIG. 2 is a block diagram showing details of interactions between the client 212, the server player management server 200 and the game outcome server 201 and functional components of servers 200 and 201 for one embodiment of the present invention. The client 212 may connect to the player management server 200 and game outcome server 201 using a secure socket layer protocol. The server 200 and server 201 may store various communication protocols needed to communicate with various clients over various network infrastructures.

As noted above, the player management server 200 may be the system hosted by the operator that handles registration 250, verification 251 and banking functionality 252 for the player using client. It may also provide other functionality such as promotions, loyalty programs 256 and the like. The player management server 200 may execute an integrated casino software platform to provide its functionality. In addition, the player management server 200 may provide web-hosting 254, game history 257 including links to game history stored on 201 and account management including player gaming preferences. Information generated on the player management server 200 may be stored and organized in database 259.

The player management server 200 may include utilities 258 that allow an operator to select gaming content available on the game outcome server 201 for display on the web-site hosted by 200. The utility 258 may display a list of gaming services available from server 201, such as various slot games, card games, dice games, keno games, bingo games, progressive games, individual and group bonus games, tournament games and the like, that an operator may select and potentially a revenue share associated with each gaming service or some other costing model. After selection of a gaming service by an operator, the selected gaming service may be made active on the operator's web-site. In the general, the gaming service may be any software function available on game outcome server 201 that can be provided to client 212 when the client selects a link to the software function on the operator's web-site.

In addition to displaying game lists, the utility 258 may allow an operator to view paytable information (odds of a particular game outcome occurring), payout information (award associated with game outcome) and a payback percentage for the game. In a particular embodiment, for a particular game they wish to utilize, the utility 258 may allow an operator to adjust or to select a particular paytable to use with a particular game that they wish to utilize, adjust a payout or award associated with the game or configure other game options including disabling or enabling a feature of the game, such as scatter pays, a number of available paylines or the denomination of the game. As an example, utility 258 may allow an operator to adjust the pay-table, such that a certain game outcome occurs more or less often. The utility 258 may also allow the operator to see the affect of their changes on pay-back percentage, such as if the operator, increases the likely-hood of game outcome but decreases the award for that outcome.

Session authentication may be a part of a module 253 that may be generated on player management server 200 to allow server 201 to authenticate a player session. A player session may be initiated when the client 212 logs onto the web-site and is verified by server 200. The Session keep alive may be part of the module 253 that may be provided on server 200 that allows server 201 to keep a gaming session alive during game play provided by server 201. In one embodiment, the player management server may allow the game outcome server access to a portion 260 of its database 259 while shielding other data. The game outcome server view 260 may be a subcomponent of the native database 259 that player management server 200 utilizes to provide gaming services on client 212. The player management server view 260 may provide ready access to a current player balance as well as the capability to record a game transaction, which updates the player balance stored on server 200. It may also be used for session authentication if enabled by the operator.

In another embodiment, the player management server may not allow outside access to the native database 259. In this embodiment, the game outcome server 201 and player management server 200 may utilize a transactional approach that allows the player balance maintained on the player server 201 to be properly updated by the game outcome server. Details of transactional of embodiments of transactional approaches are described in more detail with respect to at least FIGS. 3, 4A-4B.

The game outcome server 201 may provide gaming content to remote clients, such as 212, via a network infrastructure, such as 206. It may be designed to integrate with an operator's native system, which may be an integrated casino software platform hosted on a device, such as player management server 200. To provide game content to various clients, the game outcome server 201 may include a game engine 263. The game engine 263 may be used to manage game play provided on the remote client, such as 212, and to provide game related integration that may be needed between the server 200 and server 201.

The game outcome server 201 may include a remote device interface manager 267 that manages all non-game related integration between the other gaming platforms, such as the player management server 200 or other gaming platforms providing player management functions such as a casino type gaming machine. The session management component 265 of the remote device interface manager 267 may keep track of session information that uniquely identifies a game play session that was initiated on server 200 via a selection of a link to a game generated on the game outcome server. The session information may include but is not limited to a time that the session began, a time the session ended, a session identification number, a time each game played during the session began, a time each game played during the session ended and a session expiration time. The session identification information may also include information that identifies player management server 200, client 212 and a player playing the game. Although, in particular embodiments, the player may remain anonymous and the game outcome server 201 may not store any player identification information. The remote device interface manager 267 may store information it has obtained in database 266.

The RNG 261 may provide random number generation 261. The random numbers provided by RNG 261 may used to determine a game outcome for a game played on client 212. When the game outcome server provides a game of skill, the game outcome server 201 may use the RNG to add randomness to the game of skill. The game administrator 264 may allow an operator to remotely configure their access to game services provided by the game outcome server. Further, an operator of the game outcome server may use the game administrator 264 to configure gaming services that are available to different gaming platform operators. For example, certain premium gaming services available on a remote gaming platform, such as the player management server 200, may not be available to every operator of a gaming platform. In another example, the game administrator may be used limit or block access to the game outcome server 201 when a particular operator has not kept their account current with operator of the game outcome server 201. In yet another example, the game administrator 264 may allow a remote operator to view different revenue share models offered on the game outcome server 201. Depending on what revenue share model is selected, different game access privileges on the game outcome server may be granted.

The game outcome server 201 may include game history logic 262 that allows information relating to games provided by the game outcome server 201 to be stored and accessed. The game history information may be stored as records in database 266. In some embodiments, the game history records may be remotely accessed via the player's account that is maintained on the player management server 200. Via the player management server 200, a player may be provided with a list of their gaming activities, such as an amount wagered and an outcome to the wager. When the player wishes to view details of a gaming activity that was generated on game outcome server 201, a link to a record stored on the game outcome server 201 may be displayed via the interface generated by the player management server on the client device, such as 212. A selection of the link may initiate a connection between the game outcome server 201 and the client device that allows the player to view the desired information stored on server 201.

In one embodiment, the game history logic 257 on player management server may store, as each game is played, information regarding what device provided the game content, such as game outcome server 201, and a link that allows a corresponding record stored on the game outcome server 201. For each game or other game service provided by the game outcome server 201 via the player management server 200, the game history logic 262 may store the record that is accessed by the link stored on the player management server. The record may be stored in database 266.

When the player management server 200 receives a request from a client device, the game history logic 257 may generate a list of the player's gaming activities, which may or may not include a link, to the game outcome server 201. When a link to the game outcome server 201 is present in the list of the player's gaming activities and the player management server 200 receives information indicating a selection of the link, then the player management server 200 may contact the game outcome server 201 and then, game outcome server may establish a connection with the client device in a manner similar to when a link to a game on the game outcome server is selected, i.e., a portal, such as a window, may be opened up on the client device for receiving information from the game outcome server. The game history logic 262 may retrieve the requested information and display it on the portal on the client device as game details.

Next an example of an interaction between client 212, player management server 200 and game outcome server 201 is described that allows a gaming service to be provided on client 212. Via client 212, a player may register on player management server 200 and establish an account. In one embodiment, the player management server 200 may perform all verifications necessary before allowing the registration to succeed and the account for the player to be established. In another embodiment, the game outcome server 201 may provide verification functions (not shown) to the player management server 200. Next, the player may use the banking functionality 252 to deposit money into their account.

Later, via client 212, the player may launch a web-browser, go to a web-site provided by the player management server 200 and log into the site. After a successful login, the player management server 200 may create a session for the client 212. After a session is started, the player management server 200 may send information to the client device that allows an interface to be generated on the client device, such as but not limited to a number of different web pages. Next, the player, via their client device 212, may navigate to a page on the web-site that displays a link for the gaming service they are interested in utilizing, such as a desired game they wish to play. The link to the game may be represented symbolically, textually, may include animations or combinations thereof. Via, an input mechanism on client 212, the link may be selected and the player management server may receive information indicating the link is selected.

After the link is selected, the player management server 200 may send information to the game outcome server 201 that allows a connection between the client device 212, and the game outcome server 201 to be established. This information may include but is not limited to details about the player as well as security credentials used by the game outcome server to validate the request. The player management server 200 and/or the game outcome server may send information to the client device, such as 212, to allow the client device to receive information from the game outcome server 201.

Next, the game outcome server 201 or the player management server 200 may send information to the client device 212 that generates a modification on the client interface. For example, a new browser window may be launched on client 212 and the client 212 may be redirected to game outcome server 201. The new browser window may be customized with graphics, audio, or other media to maintain a consistent audio and visual presentation between the game and the player management server 201. The customization may include colors, a logo, language-specific text, betting limits, and game-related controls. In another embodiment, the game outcome server 200 or the player management server may download any custom or proprietary software application that is compatible with the client device for playing a game in response to information received from the game outcome server 201, such as a game outcome generated on the game outcome server.

The game outcome server 201 may pass information to the player management server 200 including but not limited to operator authentication information, player session information, and game information that describes the selected gaming service, such as which game to load. The player management server 200 may store this information in database 259. In addition, information stored on the player management server 200 that allows the gaming service generated by the game outcome server 201 to be customized to the preferences of a player, an operator or both, may also be passed to the server 201. For instance, the operator may specify that a particular bonus game or promotion be provided with a game selected by the player or the player may specify that they wish a particular theme to be used with the game that they have selected. As another example, the game operator may wish to include some text or graphics in the game that identifies their brand, such as a logo or a casino name.

After the game outcome server 201 receives the information from the player management server 200, the server 201 may authenticate the operator against internal credentials, and may read configuration information associated with the operator. Further, in one embodiment, the game outcome server 201 may verify the location of the client device, such as using an IP address geolocation, GPS location or other suitable technology. When the client device connects with the game outcome server 201 via a web-browser, the clients IP address may be obtained from the browser. The game outcome server 201 may record the result of the location verification for the session. In one embodiment, this check may be valid for the entire session on the server 201 i.e., as long as the client 212 is logged onto server 201. In another embodiment, this check may be valid for a time period.

Next, the game outcome server 201 may authenticate the session using information received from the player management server 200. The authentication may include the use of a public-private encryption scheme. After authentication, the server 201 may get the player balance from the player management server 200. This information may be obtained as part of the session authentication step above or it may be done separately, depending on how the server 200 is configured. In one embodiment, the player balance is not maintained on the game outcome server 201. The game outcome server 201 may only calculate adjustments to the player balance, which are sent to game outcome server 201 and may maintain an approximate balance that may be displayed on the client device. In another embodiment, the game outcome server 201 may maintain a temporary balance in regards to funds transferred from the player management server 200 or another device to game outcome server 201 where the temporary balance is only affected by game play activities on the game outcome server 201 or additional transfers of funds to or from the game outcome server 201.

When the account balance is sufficient to play a selected game (e.g., the denomination of the game may require a minimum balance), the game outcome server 201 may send information to the client that allows a selected game to be played on the client interface. For instance, the game outcome server 201 may send information to the client 212 that allows the selected game to be loaded into the new browser window that was created on client 212. In this step, the game outcome server 201 may have to download a gaming application to the client 212. If the gaming application has been previously downloaded to the client and is still stored on the client, this information may be communicated from the client 212 to the game outcome server 201 and this step may not be necessary. In a particular embodiment, the gaming application may comprise a number of Flash movies that are played on a compatible media player executed on the client. In another implementation, the gaming application may comprise a Java program running in the player's browser, or a downloaded game installed on the player's client device built using technologies such as Flash, Java, C++, or C#. At this stage, the player may optionally change the game denomination from the default that was loaded or other options that are configured into the gaming application.

Next, the player may play the game that is displayed on the interface of client 212. At this point, the game outcome server 201 may record the game outcome to the local database 266, as well as send basic game play information (amounts wagered and paid, etc.) to the game outcome server 201. In one implementation the game outcome may be recorded on both the local database 266 and the remote database 259 through the use of WagerLink,™ a proprietary communication gateway software application. WagerLink™ may use a distributed transaction algorithm to ensure that the updates may all be done in a single transaction occurring on two disparate enterprises so that either both succeed or both fail. If the commit fails on either system the transaction is discarded. In another implementation, XML messaging, such as SOAP Web services, between the game outcome server 201 and player management server 200 may be used to send game information between the devices. In another implementation, a socket connection may be established between the player management server 200 and game outcome server 201. Details of some of these transaction schemes are described in more detail with respect to at least FIGS. 3 and 4A-4B.

After providing information regarding adjustments to the player's account to the player management server 200, in one embodiment, the game outcome server 201 may fetch the new player balance from the server 200 and update the interface on client 212. This information may be retrieved when game play information generated on game outcome server 201 is sent to player management server 200 for storage. In another embodiment, as will be described with respect to at least FIGS. 3 and 4A-4B, the game outcome server 201 may simply allow the player to make a wager and initiate another game. The player management server may update the client interface 212 in some manner so the player may keep track of the balance.

As noted above, the game outcome server 201 may not maintain an account balance for the player. The player may be participating in other gaming activities that affect their balance while they are playing games generated on server 201. Thus, the balance displayed on client interface of client 212, such as in the browser window coupled to game outcome server 201, may not change in sync with the adjustments to their balance generated as result of their game play on game outcome server 201. For instance, an initial player balance may be 50 credits before the play of a game. As result of the play of the game on the game outcome server 201, 10 credits may be added to their balance. Nevertheless, for the next game, their balance may not be 60 credits but some other value as determined by the server player management 200. In one embodiment, the player management server 200 may maintain a portion of the client interface for client 212 that allows the player to view their balance. In another embodiment, the player management server 200 may periodically send balance information to the game outcome server, such that it may be incorporated in the portion of the client interface for device 212 affected by the game outcome server 201.

Next, the game outcome server 201 may inform player management server 200 to extend the session expiration time so that the session is kept alive based on activity on the game outcome server 201. Next, the player may continue to play the game and all or portion of the method described above may be repeated. To end a session, the client interface on 212 may be provided with a selectable button that allows the player to indicate that they wish to end the session. In another embodiment, the player may simply close the game window on client 212 to end the session.

In a particular embodiment, the player management server 200 may display links to games on the game outcome server 201 where the player is allowed to play a game for free for demonstration purposes. The free game may allow the player to make a virtual wager and see the outcome to the game played including any award associated the game play. When a player selects a game link to free game play, the game outcome server 201 and/or the player management server 200 may disable or prevent the player's balance from being changed as result of the free game play. For example, for free game play, the game outcome server may not check to see if the player's balance is sufficient for on a game outcome or update the player's balance as a result of the game outcome.

In yet another embodiment, the game outcome server 201 may include logic that allows the game outcome server 201 to determine a charge associated with the game services that it provides. The charge may be bill to an operator of the player management server. In particular embodiments, a revenue share for the game outcome server may be calculated as a percentage of a wager or as a fee credited to the operator of the game outcome server 201 each time a gaming service is provided by game outcome server 201. The fees may vary from game service transaction to game service transaction. In another embodiment, the operator of player management server 200 may pay a subscription fee that is valid for a time period or for a number of game service transactions to the operator of the game outcome server 201. The remote game logic 258 may also include logic that allows information, such current balances that have been accumulated as a result of using the gaming services provided by game outcome server 201, revenue share models, subscription fees, a current subscription status to be displayed to an interface associated with the player management server 200.

Figure 3:
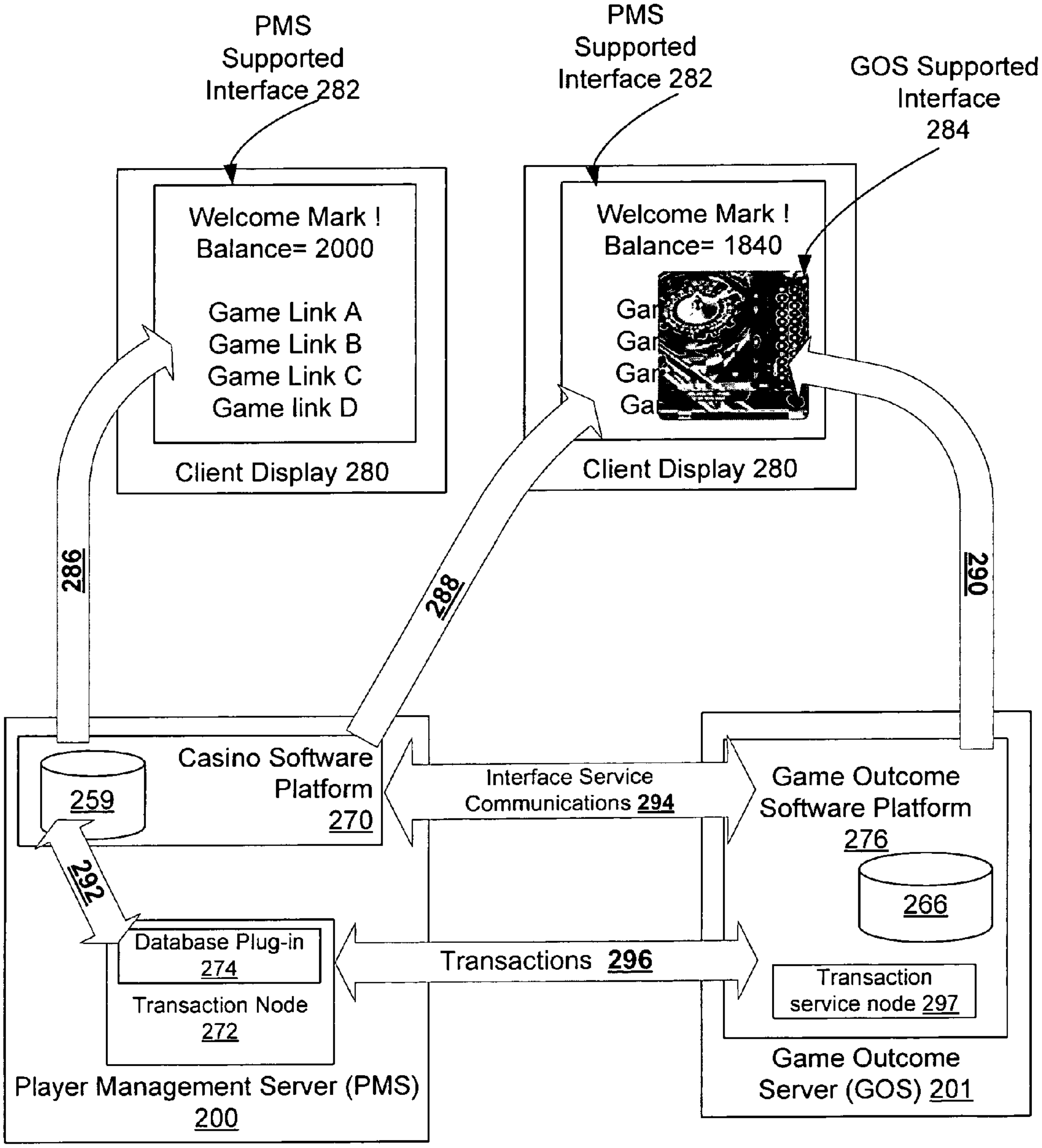
FIG. 3 is a block diagram showing details of interactions, including transaction based updating, between a client, a player management server and a game outcome server for one embodiment of the present invention.

In FIG. 3, additional details of interaction involving a player management server 200, a game outcome server 201 and a client are provided for the purposes of illustration and clarity. As previously described, the invention is not limited to interactions between only a player management server, a game outcome server and a client. In particular embodiments, details of transactions that allow the balance maintained on the player management server 200 when the game outcome server 201 provides game play services that affect the balance on the player management server 200 are described. Additional details of transactions that may occur between a client, player management server, such as 200, and a game outcome server, such as 201, are also described with respect to FIGS. 4A-4B.

As previously described, the game outcome server 201 may function as an application service provider (ASP) that hosts games, such as casino games. In a particular embodiment, player registration, banking (money handing), and account management may be handled by the player management server 200 operator's existing platform (e.g., casino software platform 270) and game play may be handled by the game outcome software platform 276. Via a client, a player may seamlessly navigate from the operator's interface 282, such as a web site, to an interface 284 provided by the game outcome server 201 without having to register or log-in into the game outcome server 201. As part of the transition from interface 282 to interface 284, the game outcome server 201 connects to the operator's casino software platform 270 to start a gaming session and to update a player's account after a player plays a game. The interface 282, such as a web-site, provided by the operator of the player management server 200, may be hosted by the player management server 200 or another server associated with the player management server 200 as part of a server system.

Via interface service communication 294, the operator of player management server 200 may select the list of games that they want to offer to their players. The game outcome server 201 may provide a web-site that allows the operator to make these selections. In a particular embodiment, the games selected from the list may be developed in Adobe Flash™ and, thus, may be web-compatible.

In one embodiment, after one or more games available on the game outcome server are selected, the selected games may be made displayed on the interface 282 provide by the game operator. A selection of one of the games available on the game outcome server 201 from the player management server (PMS) supported interface 282, such as from the operator's web-site, may cause the game to be launched in a game outcome server (GOS) supported interface 284, such as a pop-up browser window. For wager-based games, when a player launches a game and places a wager, via the game outcome supported interface 284, the game outcome software platform 276 may generate an outcome and then may send it, via the transaction service node 297 as a game transaction 296 to the transaction node 272.

A function of the transaction service node 272 on the player management server 200 may be to record the game transaction 296 and update the player's balance on the player management server 200. A function of the transaction service node 297 may be to generate or to receive one or more game transactions 296 that allow the player management server 200 and the game outcome server 201 to each be properly updated. Further, details of the game transactions are described with respect to FIGS. 4A-4B. Information related to each game played on the GOS supported interface 284 may be recorded both in the game outcome server database 266 and the player management server database 259.

To offer a game provide by the game outcome server 201, the operator may incorporate a game link into their interface, such as a web site. As an example, a player manager server (PMS) supported interface 282 with a number of game links may be generated on the client display 280. Game links A-D may be for games provided by the game outcome server 201. The game links may be represented as text, symbols, graphics, animations or combinations thereof on the interface 282.

In one embodiment, in order to provide a game supported by the game outcome server to players, an operator may incorporate the game links in a web site. A game selection web page on an operators web-site may include a game name, a marketing icon, and a means of selecting one of the available game denominations. Each game/denomination combination may be mapped to a specific universal resource locator (URL), which when selected may be forwarded on to game outcome server 201 as a game request.

The interface service communications 294 may include non-transactional application-to-application communications. The interface service communications 294 may include messages in regards to information that is displayed on PMS supported interface 292, such as the game links. When the PMS supported interface 282 is web-compatible, the casino software platform may send and may receive Web services messages as part of the interface service communications 294.

As an example of interface service communications 294, the casino software platform may use a web service call to periodically request a correct list of URL strings to use for the game links and to obtain an HTML representation or web-compatible representation of a game outcome. These two operation may be accessed by the player management server 200 as 1) GetGameList, which may be used by the casino software platform, to obtain a list of valid game URLs from the game outcome server 201, which may also be a system comprising multiple servers and 2) GetGameOutcome, which may be used by the casino software platform 270 to obtain an HTML representation or web-compatible representation describing the outcome of a game transaction. Each operation returns a response containing the requested data.

The name of an operation and its functionality may be varied and the examples provide herein are provided for illustrated purposes only and are not meant to limit the scope of the invention described herein. Further, the PMS supported interface 282 doesn't necessarily have to be web-compatible. Thus, in general, the interface communication services may be utilized to at least transfer information that is needed for generation on the PMS supported interface in a format that is compatible with the PMS supported interface, such that casino software platform 270 and the game outcome software platform are properly integrated.

The URL string for the game links may be in a specific format that is recognized by the game outcome server. An example a game URL may comprise, https://www.wager-works.com/game/play?cn=1&gm=200-12-23415&dn=3 where cn=1 indicates the casino ID=1, gm=200-12-2341 indicates the game ID=200-12-2341, and dn=3 indicates denomination ID=3. The link may be sent to the game outcome server via 294. Other formats and information may be utilized in a URL and the example above is provided for illustrative purposes only.

When a logged-in player selects one of the game links, the casino software platform 270 may generate a request indicating a particular game link has been selected and send the request with information about the selected game link to the game outcome server 201. The game outcome server may validate the request to play the game and start a gaming session for the player. For example, via a communications 290, a game outcome server supported interface 282 may be generated on the client display 280.

In one embodiment, the game outcome server 201 may attempt to determine whether a player is accessing game outcome server 201 from a client device that is located in a legal gaming jurisdiction. Thus, when players request a game, the game outcome server 201 may try to determine the players' physical location using means such as IP address, registration information, GPS data, biometric information provided by the player or other information that may be available to the game outcome server.

For example, when players request a game, the game outcome server 201 may evaluate their stated country of residence and current IP address. Information regarding the stated country of residence and current IP address may be received in the initial request received from the player management server 200. In one embodiment, when it is determined that the client device is not located in a legal gaming jurisdiction, then the game outcome server may not provide the GOS supported interface 284 that allows a game to be displayed to the client display 280.

The PMS supported interface 282 and the GOS supported interface 284 are illustrated as two windows where interface 282 takes up a full portion of the display and interface 284 is displayed above it. The present invention is not limited to this configuration. In one embodiment, interface 282 or interface 284, may utilize all or a portion of the client display 284. In some embodiments, the interfaces, 282 and 284, may generated such that they each occupy a portion of the display 280 and don't overlap. In another embodiment, interface 282 and interface 284 may be a shared interface where a portion of the shared interface is updated by the player management server 200 and a portion of the interface updated by the game outcome server 201. In some embodiments, the player management server 200 and the game outcome server 201 may share control of the client interface.

In another embodiment, only one of the game outcome server 201 or the player management server 200 may be given control of the client interface at a particular time. For example, after a game link is selected, control of the client interface may be switched from the player management server 200 to the game outcome server 201. One or both of the game outcome server or the player management server may each incorporate logic that allows control the client interface to be switched between the game outcome server and the player management server and set of conditions under which a switch may occur. For instance, the player management server may allow the game outcome server to control the client interface after a game link is selected. In another embodiment, the player management server may take over control of the client interface from the game outcome server when information from the client or game outcome server is received that indicates that the player no longer wishes to utilize the game activities provided by the game outcome server.

When one of the game outcome server 201 or the player management server 200 is in control of the client interface, the device or system not in control of the client interface may be operable to request control of all or a portion of the client interface from the device or system that is control of the client interface. Further, the device or system that is not in control of the client interface may be operable to provide information to the device or system that is in control of the client interface. The device in control of the client interface may be operable to display information provided by the device that is not in control of the client interface on the client interface.

When a URL is utilized as a game link, country information, security information, player specific information and other information that may be utilized by the game outcome server may be appended to a selected game link in a dynamic manner. As noted in the previous paragraph, the game outcome server 201 may use the country information to determine whether the client is accessing the game outcome server 201 from a legal jurisdiction. As an example, the game outcome server 201 may receive from the player management server 200 a URL request consisting of a string specifying the game, the player's account ID, an ISO 3166 country code indicating the player's stated country of residence, and a security token.

Additional information may also be passed in the URL such as initial player buy in amount (see FIG. 4B for additional details), player protection settings, and player preferences. The player protection settings may be a limit that an operator, a gaming jurisdiction, a player or combinations thereof, desires to have the game outcome server enforce, such as but not limited to a maximum wager, a wagering rate, a length of a session, a number of games played, a maximum amount lost, a maximum amount wagered, a number of games played over a particular time, etc. The player protection settings may be a part of the player preferences when selected by the player. The player protection settings and player preferences may be associated with an account maintained by the player management server 200.

In general, after a player has logged into the player management server 200 and when a PMS supported interface 282 with game links is generated on the client display 280, then, when the player management server 200 receives a message indicating a selection of one of the game links on the client, the player management server 200 may append additional information to the URL that corresponds to the selected game. For example, the game URL, https://www.wagerworks.com/game/play?cn=1&gm=200-12-23415&dn=3, may correspond to the selected game and information specifying the player's account, country, and security token may be appended dynamically to URL by the player management server 200. An example of a game URL with appended information may be: https://www.wagerworks.com/game/play?cn=1&gm=200-12-23415&dn=3&pid=812736&ccd=GB&token=7B960B1ACF2D82892D4CE62DAA4 2, where pid=812736 has been appended to the game URL string to specify a player ID, ccd=GB has been appended to specify the player's country, and token=7B960B1ACF2D82892D4CE62DAA42 as been appended to pass a security token.

In one embodiment, when the game outcome server 201 determines the legal gaming jurisdiction associated with the client, then the game outcome server 284 may apply rules associated with the gaming jurisdiction. For instance, the gaming jurisdiction may include rules in regards to a maximum wager amount, a maximum amount wagered over time period, types of games that may be played, etc. The game outcome server 201 may configure any games that are displayed on the client display 280 via the GOS supported interface 284, such that the gaming jurisdiction rules are enforced.

When a player places a wager on the game on their client device via the GOS supported interface 284, the game outcome server 201 may generate a random outcome and may determine a win or loss including the incremental change to the player's balance as a result of the win or the loss. Next, the game outcome server 201 may report the result of the game including the change to the player's balance to the player management server 200 via the transaction services 295. The player management server may check the player's balance to ensure that the player has sufficient funds to place the wager and that the account is in good standing (the account is active, any wagering limits are not exceeded, the session is still valid).

When the wager is valid, the transaction may be recorded on both systems, 200 and 201, and the player's account balance may be updated on the player management server 200. If the player wants to review his or her game play history and makes a request via the client device, in one embodiment, the player management server 200 may be operable to obtain an HTML representation of a game outcome description from the game outcome server 201 on demand. The HTML representation for the game play history may be provided from a request via the interface services 294.

In a particular embodiment, the game outcome software platform 276 may use two components to deliver integration with the casino software platform 270: a transaction node 272 local to the player management server, and a transaction service node 297 local to the game outcome server 201. The transaction node 272 and the transaction service node 297 may bridge communications between the casino software platform 270 and the game outcome server platform 276 such that transactions 296 including game transactions that involve a change in a player's balance maintained on the player management server 200 are performed in a secure and efficient manner.

In one embodiment, the transaction node 272 may be one or more JBoss application servers, running the JBoss Transaction Manager and a J2EE application 274 that interfaces, via communications 292, with the casino software platform 270 including database 259, to provide game integration logic. The JBoss suite is an open source middle ware platform. The Jboss application may be executed on the player management server 200 or a separate server coupled to the player management server 200 as part of a server system.

To allow the game outcome server to 201 to generate games that affect a player's balance maintained on the player management server requires an information exchange between the player management server 200 and the game outcome server 201. In embodiment, as described with respect to FIG. 2, the player management server 200 may allow the game outcome server 201 direct database access. In this embodiment, logic for directly updating the databases 259 and 266 resides on the game outcome server side. Some operators of player management servers 200 may be weary of letting a remote device, such as a game outcome server 201 directly access their database 259. Database 259 stores information related to financial transactions and any tampering with the database can lead to a bogus payout of funds by the player management server 200. Thus, operators may consider allowing a remote device to directly access database 259 an unacceptable security risk.

In another embodiment, to update the player's account with each game transaction provided by the game outcome server 201 without direct access to database 259, the data in the casino software platform database 259 may be updated from information communicated to the player management server 200 by the game outcome server 201 via transaction services 296. In particular, to allow database 259 to be updated with information from the game outcome server 201 where direct access to the database 259 is not allowed, in one embodiment, the database update operation may handled by database plug-in 274, such as a Java plug-in. The database plug-in 274 may be configured to prevent the game outcome software platform 276 from having direct access to the database 259. In one embodiment, the plug-in may be a J2EE application that interfaces with the transaction node 272 using a Java API.

As previously described, in one embodiment, communication 296 between the local transaction node 272 on the player management server 200 and the transaction service node 297 on the game outcome server 201 may be facilitated by the JBoss platform. The game play presented on the client may occur as a distributed transaction occurring both on the casino software platform 270 and the game outcome software platform 276. In a particular embodiment, the transaction node 272 may use remote procedure calls using the Java Naming Directory Interface (JNDI) and/or Remote Method Invocation RMI and/or Java application program interface (API) to facilitate transactional requests involving database 259. Database plug-in 274, such as the Java application program interface, may be designed to limit what information may be updated and accessed in the database 259, thus, affording a higher-level of security to the player management server 200. Additional details of the database plug-in 274 and its functions are described in the following paragraphs.

The casino software platform 270 may be integrated with the game outcome server platform on a number of levels. The transaction node 272 may use the database plug-in 274 to access the database 259. In one embodiment, the plug-in 274 may be developed using an API associated with the transaction node to construct an integration layer between the transaction node and the casino software platform database 259.

In one embodiment, the plug-in 272 may accept data passed by the transaction node 272, using an API call associated with the transaction node, such as a SendGameTransaction operation. Then, the plug-in 274 may validate and store the data in database 259. For example, the plug-in may invoke a secure query language (SQL) statement to validate and store the data in the database 259. As is described below, the SQL statement may implement a number of logical steps that determine whether the transaction is to be validated and stored. In one embodiment, the transaction service node 297 may rely on the plug-in 274 to validate each game transaction as part of the commit operation. The commit operation may include but is not limited logic to confirm that the player has sufficient funds to have placed the wager, has an active account, and has not reached any betting limits.

For at least each game transaction that may affect a balance on the player management server 200, the game outcome server 201 via the transaction service node 297, may generate and store internally in database 266 one or more of the following data:

- A Unique player ID (example: 8127363)
- A Game name (example: Blackjack)
- A Game ID (example: 200-12-2341)
- A Game transaction ID (example: 5616511511)
- A Game transaction timestamp (example: 2006-12-25:23:59:00)
- A Currency (example: GBP, Euro)
- A Bet amount (example: 10.00)
- A Payout amount. In multistage it may be the running payout (example: −10.00)
- A flag to indicate if the database should commit the transaction (e.g., Yes or No)
- A first transaction status (e.g., 'I' for a new transaction, 'U' for game transactions in progress)
- A second transaction status (e.g., in Progress "PROG", On Hold "HOLD", Completed "COMP")
- A current user session ID created in the database, which may be separate from an HTTP session ID
- A calling ID, also called the skin code
- A pay model of the game
- A pending amount or running total that may be applied in multistage games.
- Amount withdrawn by the player during this update i.e. player may withdraw some of the wager amount during the game.
- Amount paid by the player during this update. Also, may be called service charge.
- An ID associated with the game outcome (may be provided by the random number generator routine)
- The number of additional game stages (e.g., 1, 2, 3, for single stage games it is 0)
- The game outcome in XML format
- The player's balance received from the player management server.
- A reference to a transaction ID generated by the player management server.
- A buy-in amount
- A temporary balance maintained during a series of transactions involving a buy-in.

As an example, the game outcome server 201 may store and/or generate the data listed above in response to a request to generate a game form the client device (See also step 628 in FIG. 4A). All or a subset of the data listed above may be sent to the player management server 200 via the transaction service node 297 (See also step 630 in FIG. 4A). The transaction node 272, may receive the data and send it to the database plug-in 274 for processing. In particular embodiments, the plug-in 274 may be operable to record all or a portion of the received data using a SQL statement or by calling a procedure that applies the appropriate logical conditions.

As an example, as part of a game transaction, after receiving data from the game outcome server 201, such as but not limited to all or a portion of the data listed in the previous paragraph, the database 259 may be updated under one or more of the following conditions:

The player's account status is Active

The player has adequate funds to have placed the bet

The bet won't cause the player to exceed any betting limits

The player's session is active

Then in database 259:

Debit/credit player's account balance

Record game transaction record

In one embodiment, these conditions may be integrated into an SQL statement. These conditions are provided for illustrative purposes only as the conditions that are utilized above may vary from transaction to transaction (i.e., different transaction may utilize different conditions), operator to operator (i.e., different operators may utilize different conditions), or even vary from player to player (e.g., different player's may have different betting limits).

After the player management server 200 has received transactional information from the game outcome server 201, such as information relating to a game transaction, and potentially updated its database 259 (the database 259 may updated when the transaction is valid), the player management server may generate and send an acknowledgement message to the game outcome server 201 (See also 636 and 638 in FIG. 4A). The acknowledgement message may include but is not limited to one or more of the following data:

A reference to the transaction ID generated by the player management server

The player's account balance (e.g., 1840)

Status of the operation (e.g., Success=0, Failure=−1)

An error code returned by the player management server when an errors occur

A text message returned by the when an error occurs

In response to receiving the acknowledgement message from the player management server 200, which may include information listed in the previous paragraph, the game outcome server may generate an additional message and send it to the player management server 201. An example of some of the information that may provide with the message includes but is not limited to:

The game transaction Id for the entire game (single or multi stage game).

The amount of the wager as a base or as an additional wager, i.e. the wager entered on the screen.

Amount withdrawn by the player during this update i.e. player withdraws some of the wager amount during the game.

Amount paid by the player during this update. Also may be called service charge.

The player's payout amount. In multistage games it may the running payout

Pending amount or running total, which may be applied in multi stage games

Database error code (e.g., a code indicating transaction wasn't committed to the database 266 as a result of some error)

Database error message (a text message describing the error)

By treating game play as a distributed transaction (e.g., a game transaction that affects a balance maintained on the player outcome server 201), synchronous updates on both the casino software platform 270 and the game outcome server platform 276 may be ensured. In a distributed transaction, both the casino software platform 270 and the game outcome software platform 276 may agree to commit the transaction in order for the transaction to succeed. If the commit fails on either system the transaction may be discarded. The game outcome server 201 may depend on the commit operation performed by the Database plug-in 274 to apply the operator's business logic for validating bets. When player management server 200, via database plug-in 274 in transaction node 272, determines a game transaction, such as a bet is invalid, the game transaction may not be recorded and the outcome may be ignored. Further details of communications/interactions including game transactions are described with respect to FIGS. 4A-4B.

FIG. 4A is an interaction diagram between a client, a player management server and a game outcome server for one embodiment of the present invention. Prior to 602, a player via a client may have established a communication session with the player management server and an interface associated with the player management may have been displayed on the client. For example, via the client, the player may navigate to a web-site provided by the player management server and may log-in at the web-site to access their account. The account may store funds that the player may use for gaming activities, such as playing a wager-based game and additional information about the player, such as the player's name, address and financial information. When the player doesn't have an existing account associated with the player management server, the player may register at the web-site to establish an account.

After the initial communication session is established with the client, the player management server may send information to the client that allows an interface generated on the client to display one or more games that a player may play on their client device. In a particular embodiment, at least one game provided by the game outcome server (GOS), referred to as a GOS game, may be displayed on the client interface in a manner such that the GOS game may be selected and a communication session between the game outcome server and client initiated. In 602, via the interface displayed on the client, the player may select the GOS game.

In 604, information indicating the selection of the GOS game may be sent to the player management server. In 606, the player management server may gather game and player information used by the game outcome server. The game and player information may allow the game outcome server to establish a communication session with the client.

In a particular embodiment, the player management server may generate a URL string to send to the game outcome server. The URL string may comprise information that allows the game outcome server to identify one or more of the following a) the selected game, b) a unique identifier for the player (e.g., a string of numbers/letters generated by the player management server), c) the player's stated country of reference, d) a player buy-in amount, e) player preferences, f) player protection settings, g) operator customization data (e.g., an on-line casino name), h) a security token or i) combinations thereof. A portion of the URL string that identifies the game may have been initially sent to the player management server from the game outcome server. The present invention is not limited to transferring information via a URL string and the information such as but not limited the game identifier, player identifier, country identifier, the player buy-in amount, player preferences, player protection settings, operator customization data and security token may be sent from the player management server to the game outcome server in other formats. The security token may allow the game outcome server to verify an identity of the player management server.

In 608, game and player information, such as but not limited to the game identifier, player identifier, country identifier, the player buy-in amount, player preferences, player protection settings, operator customization data and security token may be sent to game outcome server. In 610, the game outcome server may parse the information received from the player management server. The game outcome server may determine whether the security token is valid and the game identifier corresponds to a game available on the game outcome server.

As described with respect to at least FIG. 3, he game outcome server may communicate game identifiers to the player management server. The game identifiers may be valid for only a particular time period. Further, game availability status associated with a particular game identifier may change from available to unavailable. Thus, for example, when the player management server is not updated properly, the game identifier may not correspond to a game that is available or to a game that the game outcome server is allowed to provide to the player management server.

The game outcome server may be in communication with a plurality of player management server. In one embodiment, each player management server may be provided with unique game identifiers associated with the games that the game outcome server is allowed to provide to them. This identifiers may be encrypted. Thus, for a first game generated on the game outcome server, a first player management server enabled with a link to the first game may receive a first game identifier for the first game and second player management server enabled with a link to the first game may receive a second game identifier for the first game. When the game outcome server receives the first game identifier for the first game or the second game identifier for the second, it may check to determine whether the first game identifier or the second game identifier is correct for the player management server from which it was received.

In 611, when it is determined the session is valid, in 612, the game outcome server may generate interface support and in 620 send commands, instructions, data, software or combinations thereof that allow a game to be generated on the client interface. For instance, as previously described with respect to FIGS. 1-3, the commands, instructions, data, software or combinations thereof, may comprise in one embodiment flash movies compatible with a media player executed on the client or, in another embodiment, a propriety software package. In 622, the GOS supported interface may be generated on the client.

During game play, in one embodiment, the player management server (It is noted that the player management server or the game outcome server may be a system comprising a plurality of devices) may provide balance information to the client in regards to a player's current balance as maintained on the player management server. In one embodiment, in 614, the player management server may gather the balance information and send it, in 616, to a player management server supported interface for display on the client interface in 618 (e.g., see FIG. 3). In another embodiment, the player management server may send the balance information to the game outcome server, which may then send the information in a format that allows the game outcome server supported interface to display the balance information on the client. In yet another embodiment, the game outcome server, as described in detail with respect to FIG. 4B may maintain a temporary balance that may be updated by the game outcome server on the client. The temporary balance may be displayed on the client in lieu of the balance maintained on the player management server or in conjunction with the balance maintained on the player management server.

In 624, via GOS supported interface, a gaming activity may be initiated on the client. For example, a player may make a wager on a game outcome for a slot game and indicate a wish to start the game on the client interface. In 626, information, such as game information and wager information, may be sent to the game outcome server.

In response to receiving the request to play the game, in 628, the game outcome server may generate a game outcome and an award associated with the game outcome. A change in the player's balance, which may be the award amount minus the wager may be calculated. Next, the game outcome server may determine whether the game transaction that the player has requested is valid.

In one embodiment, when the game outcome server receives the request for the game transaction, which may include information regarding a gaming activity that the player wants the game outcome server to perform, the game outcome server may attempt to determine whether the player is eligible to receive the requested game transaction. For example, when the game transaction involves a wager on a game outcome, the game outcome server may send a message to a balance handling device that manages the player's balance, such as a player management server, requesting whether the player is eligible for the game transaction. The game outcome transaction may store information related to the requested game transaction in a local memory and mark the transaction pending.

The message received at the player management server may include information regarding the cost of the game transaction and other parameters that describe/identify the game transaction. To determine whether the player is eligible for the game transaction, the player management server may at least check the player's balance to check to determine whether it is great enough to support the cost of the game transaction. The balance check may include an affect of pending transactions on the balance. For example, when an outstanding wager is associated with the account and the outcome to the wager is not yet known, the amount of the wager may be subtracted from the player's balance. Other factors, such as wager limits for a single game or an amount lost over a time period may also be checked to determine whether the player is eligible for the requested game transaction.

When the player management server determines that a player is eligible for the requested game transaction, the player management server may subtract the cost of the game transaction from the player's balance and mark the transaction pending in its database. The player management server may then send a message to the game outcome server indicating the player is eligible for the game transaction. In response, the game outcome server may calculate an outcome to the game and an associated award. Parameters associated with the game transaction such as the game outcome, award amount and information identifying the transaction may be stored and the transaction marked complete. In parallel or sequentially, the game outcome server may send a message to the player management server identifying the game transaction and indicating an amount of the award and in 642, generate commands, instructions, data or combinations thereof that allows the game outcome and associated award to be presented on the GOS supported interface in 654.

Optionally, prior to updating the client interface in 654, the game outcome server may send a second message to the player management server comprising the award amount and game transaction identification information requesting whether the player management server approves the award. Since the operator associated with the player management server may be financially obligated to provide the award generated on the game outcome server, an operator may wish to have an award approved prior to notifying the player. The player management server may generate a response to the game outcome server indicating whether it is authorized to provide the generated award. When the player management server determines that the game outcome server is authorized to provide the award, then the player management server may commit information related to the game transaction to a local storage device for archival, auditing, dispute resolution and/or accounting purposes, mark the transaction complete and update the player's balance. The local storage device may support a database.

When the game outcome server receives the message that it is eligible to provide the award it generated, the game outcome server may then generate the commands, instructions, data or combinations thereof that are sent to the client in 644 that allow the game outcome and an associated award to be presented on the client interface. The game outcome server may store information related to the game transaction to a local storage device for archival, auditing, dispute resolution and/or accounting purposes and mark the transaction complete. The game outcome server may send a message to the player management server indicating it has completed the game transaction.

Returning to FIG. 4A, in another embodiment, in 628, the game outcome server may generate the game outcome and a change in the player's balance as a result of the game outcome. Then, the game outcome server may generate and send a message in 630 to the player management server where the message may comprise information identifying the requested game transaction, wager amount and change to the player's balance. The game outcome server may also mark the transaction pending and store information related to the game transaction.

In 632, the player management server may receive the message, parse information from the message and determine whether the player is eligible for the requested game transaction. In 634, when the transaction is valid, the player management server, in 636, may generate an acknowledgement message indicating the requested game transaction is valid and send the acknowledgement information to the game outcome server. In 636, the player management server may also update the player's balance, may mark the game transaction complete and may store information related to the game transaction to a local database. As was described with respect to 614, 616 and 618, in 650,652 and 656, the player management server may update the player's balance on the client interface.

In 640, when the game outcome server receives the acknowledgment message and when the message indicates the player is eligible for the requested game transaction, the game outcome server may update a local database with information about the game transaction and may mark the game transaction complete. Then, via 642, 644 and 654, the interface on the client device may be updated with the game outcome.

When the player is not eligible for the requested transaction, the game outcome server may delete or rollback the pending game transaction and its associate outcome from its record or may store some record of the requested transaction. The game outcome server may rollback the client interface to its state prior to the request of the rejected game transaction. In one instance, the game outcome server may delete or may rollback a pending transaction in response to a message received from the player management server indicating that the player is not eligible for the requested game transaction. In another instance, the game outcome server may delete or may rollback a pending transaction in response to not hearing a response from the player management server within a specified time period.

FIG. 4B is an interaction diagram between a client, a player management server and a game outcome server for one embodiment of the present invention. In 602, 604, 606, 608 and 610, a GOS game may be selected on the client, info sent from the client to player management server, the player management server may gather and send game player information to the game outcome server and the game outcome server may validate the game request in a manner as is described with respect to FIG. 4A. After the game outcome server determines that the selected game is to be provided on the client, in 601, the game outcome server may generate commands, instructions, data or combinations thereof that allow an interface for the game to be displayed on the client and in 603 may send the interface related information to the client. The GOS supported interface may be generated on the client in 605.

In a particular embodiment, the game outcome server may allow for a player to make a buy-in. As part of the buy-in, the player may transfer funds from a balance handling device, such as the player management server, to the game outcome server. The GOS supported interface on the client may allow the player to specify an amount of funds to transfer and optionally a balance handling device from which to transfer the funds. In another implementation, the player management server may specify an amount of funds to transfer when the player selects a game without prompting the player. After a successful transfer of funds to the game outcome server and while the funds remain, the player may use the transferred funds for one or more game activities provided by the game outcome server, such as to play a series of games where a wager is made on an outcome for each game. The game outcome server may maintain a temporary balance relating to the transferred funds on the game outcome server and update the temporary balance in response to each gaming activity initiated by the player. In response to an event generated on a remote device or in response to an event generated on the game outcome server, the game outcome server may transfer the temporary balance to a balance handling device, such as the player management server. This method is described in further detail as follows and may be combined with the methods and apparatus described previously with respect to FIGS. 1-4A or as follows with respect to FIGS. 5-7.

Via the GOS supported interface on the client, in 605, the player may initiate a buy-in transaction request and in 607, the client may send information relating to the buy-in transaction request to the game outcome server. The buy-in transaction request information may include an amount of funds, which the player desires to transfer from the player management server to the game outcome server. In response to receiving the buy-in request from the client, in 609, the game outcome server may initiate the transaction including storing information related to the buy-in transaction and mark the transaction pending, and in 611, send a buy-in request to the player management.

In 615, the player management server may approve or deny the transfer of funds to the game outcome server. When the buy-in transaction is approved, the player management server may generate and store a record of the transaction in a local database in reference to the player's account from which the funds were transferred. The player management server may be operable to allow the player to later retrieve information related to the transferred funds, such as 1) a target device to which the funds were transferred, 2) how the transferred funds were used on the target device, 3) whether any of the transferred funds still remain on the target device, whether funds were transferred from the target device back to the player management server, 4) any adjustments to the player's balance on the player management server as a result of transfers of funds from the player management server or into the player management server or 5) combinations thereof.

To carry out the operations listed in the previous paragraph, the player management server may have to contact and receive information from the target device, such as the game outcome server, that received the transfer funds. For instance, the player management server may not have any information in regards to how the funds transferred to the game outcome server were used on the game outcome server and thus, may have to contact the game outcome server and request this information from the game outcome server for this information. In 617, the buy-in transaction information sent from the player management server to the game outcome server for an approved buy-in may include a buy-in transaction record locator. The player management server and the game outcome server may store the buy-in transaction record locator, such that information relating to the transferred funds may be later retrieved.

The present invention is not limited to a buy-in transaction request initiated via the GOS supported interface. In other embodiments, the player management server may support an interface on the client that allows the player to transfer funds to a target device, such as the game outcome server. For example, when the player selects the GOS game in 602, the player management server may be operable to allow the player to select a buy-in amount along with the game. When the buy-in amount is approved by the player management server, information related to the selected GOS game and the buy-in amount may be sent with the information in 608. After the validation 610, the game outcome server may proceed to 621.

After the game outcome server receives the buy-in information, in 619, the game outcome server may update its database with the buy-in transaction information comprising a temporary balance associated with the transferred funds and/or a record locator associated with the buy-in transaction. In 621, when an interface for the GOS game has been already generated on the client device, the game outcome server may generate information that allows the interface for the selected GOS game to be updated with information including the temporary balance on the client. The update information may include commands, data, instructions or combinations thereof sent in 623. In 651, the client may generate the GOS supported interface including the temporary balance.

In 627, the player may initiate a game activity where all or a portion of the temporary balance is applied to the gaming activity. For example, the player may make a wager on a game outcome to a game and initiate the game. In 629, information relating to the game activity may be sent to the game outcome server. In 631, the game outcome server may validate the requested game transaction. For instance, the wager may have to below a wager limit. When the requested game transaction is valid, in 631, the game outcome server may generate the requested game transaction, such as generate a game outcome, determine an award associated with the game outcome, determine any changes to the temporary balance resulting from the game transaction and generate information used to modify the GOS supported interface on the client. In 625, a local database on the game outcome server may be updated with information relating to the generation of the game transaction, such as but not limited to the game outcome, changes to the balance, etc (Additional information that may be generated and stored was described with respect to FIG. 3).

In 633, the game outcome server generated information relating to modifications to the GOS supported interface on the client, such as commands, instructions, data or combinations thereof, may be sent to the client. The information may allow the client, in 635, to display an outcome to the GOS game and display a new temporary balance. Next, the method may return to 627 and the player may initiate a new gaming activity, such as making a wager on the outcome of a GOS game and 629, 651, 631, 633 and 635 may be repeated.

The player may request game activities generated on the game outcome server as long as the player has a sufficient temporary balance. During a gaming session on the game outcome server, when the temporary balance doesn't support a requested gaming activity, the player may initiate an additional buy-in as in 605. In addition, in one embodiment, during a game session on the game outcome server, the GOS supported interface may allow a player to initiate a cash-out transaction request.

In 637, the cash-out transaction request and information relating to the request may be sent from the client to the game outcome server. In response to receiving the cash out request, in 639, the game outcome server may initiate a transfer of funds to a remote device, such as the player management server. In 653, the local database on the game outcome server may be updated with information indicating a transfer of funds from the game outcome server has been initiated and information relating to the transaction.

In 641, information relating to the cash-out transaction may be sent from the game outcome server to the player management server. In 645, the player management server may approve the transaction and in 643, update the player's account with the transferred funds received from the game outcome server. The amount of funds transferred from the game outcome server to the player management server may be greater, the same or less than the initial funds transferred to the game outcome server from the player management server depending on results from the one or more game activities generated on the game outcome server. In 647, an acknowledgement of the transfer may be sent from the player management server to the game outcome server. In response, when the game outcome server receives the acknowledgement, in 647, the game outcome server may update its database to indicate that the cash-out transaction has been completed.

The transfer of funds relating to a temporary balance maintained on game outcome server may be initiated in other ways different from a cash-out request. For example, the game outcome server may be operable to store a temporary balance for only a limited time period. After the time period has expired, the game outcome server may automatically transfer funds in a temporary balance to a balance handling device, such as the balance handling device that initially transferred the funds to the game outcome server. In another example, the player management server may periodically request transfers of funds from the game outcome server in regards to buy-ins provided from funds that were stored on the player management server. In another embodiment, the game outcome server may initiate a transfer when a connection between the client and the game outcome server is terminated.

In particular embodiments, the game outcome server may not be operable to convert a temporary balance to a form that may be utilized by a player, such as redeeming their temporary balance for a cashable check because the game outcome server may not be provided with detailed information about the player. Each time a communication session is established between the game outcome server and the client, the account handling device that initiated the communication session may provide the game outcome server with a unique session identifier and store it in an account associated with the player. Thus, a first communication session initiated by the account handling device on the game outcome server for a first player and a second communication session initiated by the account handling device on the game outcome server for the first player may have different session identifiers. Thus, the game outcome server may not be able to determine that the first communication session and the second communication session involved the same player. Thus, it may not be possible for the game outcome server to establish a transaction history for a particular player because over multiple communication sessions with the game outcome server by the player, the game outcome server may not be able to tell for sure that a first session involving the player is related to a second session involving the player.

On the other hand, the account handling device may store a record of each session identifier as it is related to each player, thus, the account handling device may be able to request session and/or transaction information relating to a particular player without revealing whether the transactions are related or not. For instance, when requesting transaction information for a number of transactions by a particular player, the player management server may mix in transaction identifiers for other players in the request so that the game outcome server may not group the transactions together as belonging to a particular player. When the account handling device receives the requested information back from the game outcome server, the account handling device may group the information relating to the different transactions it requested according to a particular player.

One advantage of the transactional approach described above may be player anonymity in the game transactions between the game outcome server and one or more account handling devices. One of the most important and valuable resources of an on-line casino may be its player database. The transactional approach described above may allow multiple on-line casinos to use functions provided by a game outcome server without having to worry that their customer database is revealed to the providers of the game outcome server or to another provider of another on-line casino.

Figure 5:
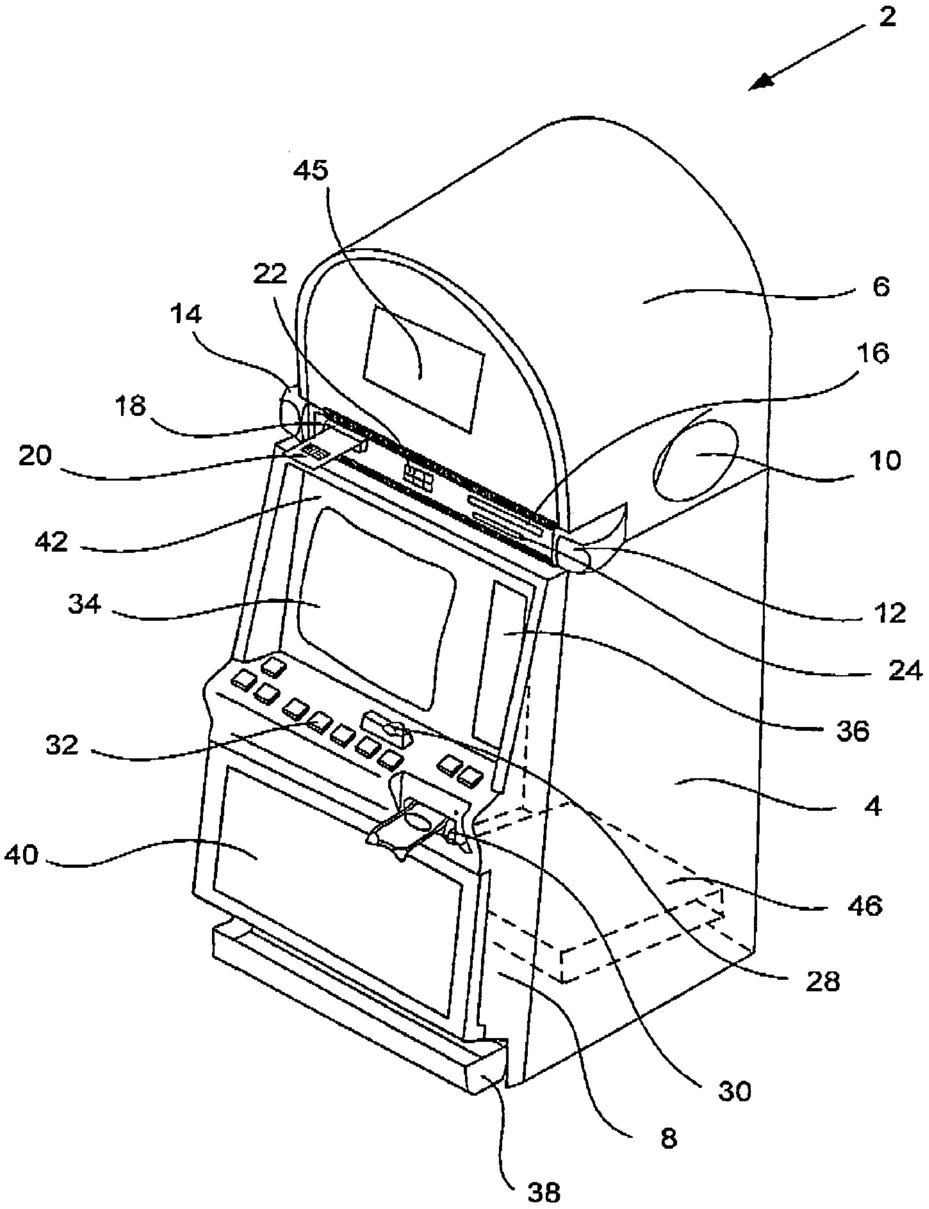
FIG. 5 illustrates a perspective view of one embodiment of a gaming machine.

FIG. 5 shows a perspective view of a gaming machine 2 in accordance with a specific embodiment of the present invention. Any of the gaming devices and gaming functions described with respect to FIG. 5 can be incorporated in the clients described above with respect to FIGS. 1-4B or the devices described with respect to FIG. 6. The gaming machine 2 is one example of a balance handling device that may be used with a game outcome server. In one embodiment, the gaming machine 2 may perform the functions of balance handling and also provide a client interface that allows a gaming activity generated on a game outcome server to presented on the gaming machine.

As illustrated in the example of FIG. 5, machine 2 includes a main cabinet 4, which generally surrounds the machine interior and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2.

According to a specific embodiment, the devices may be controlled by code executed by a master gaming controller 46 housed inside the main cabinet 4 of the machine 2. The hardware and software associated with the master gaming controller 46 may be distributed throughout the cabinet 4 and is not limited to the specific location illustrated in the FIG. 5. In specific embodiments where it may be required that the code be periodically configured and/or authenticated in a secure manner, the technique of the present invention may be used for accomplishing such tasks.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

As illustrated in the example of FIG. 5, the gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 45. The ticket printer 18 may be used to print tickets for a cashless ticketing system. Further, the top box 6 may house different or additional devices not illustrated in FIG. 5. For example, the top box may include a bonus wheel or a back-lit silk screened panel, which may be used to add bonus features to the game being played on the gaming machine. As another example, the top box may include a display for a progressive jackpot offered on the gaming machine. During a game, these devices are controlled and powered, in part, by circuitry (e.g. a master gaming controller) housed within the main cabinet 4 of the machine 2.

It will be appreciated that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in International Game Technology (IGT) gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., balance) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," each of which is incorporated by reference and for all purposes.

Another feature of gaming machines, such as IGT gaming computers, is that they often include unique interfaces, including serial interfaces, to connect to specific subsystems internal and external to the gaming machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the gaming machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, e.g., via software for reading status registers. This can trigger event log entries and further data authentication operations by the gaming machine software.

Trusted memory devices and/or trusted memory sources are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the gaming machine. The code and data stored in these devices may include authentication algorithms, random number generators, authentication keys, operating system kernels, etc. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of the verification algorithms included in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities.

Gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "Secured Virtual Network in a Gaming Environment", naming Nguyen et al. as inventors, filed on Mar. 10, 2005, herein incorporated in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with the present invention are described, for example, in U.S. Pat. No. 6,149,522, herein incorporated by reference in its entirety for all purposes.

Returning to the example of FIG. 5, when a user wishes to play the gaming machine 2, he or she inserts cash through the coin acceptor 28 or bill validator 30. Additionally, the bill validator may accept a printed ticket voucher, which may be accepted by the bill validator 30 as indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 45 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 6:
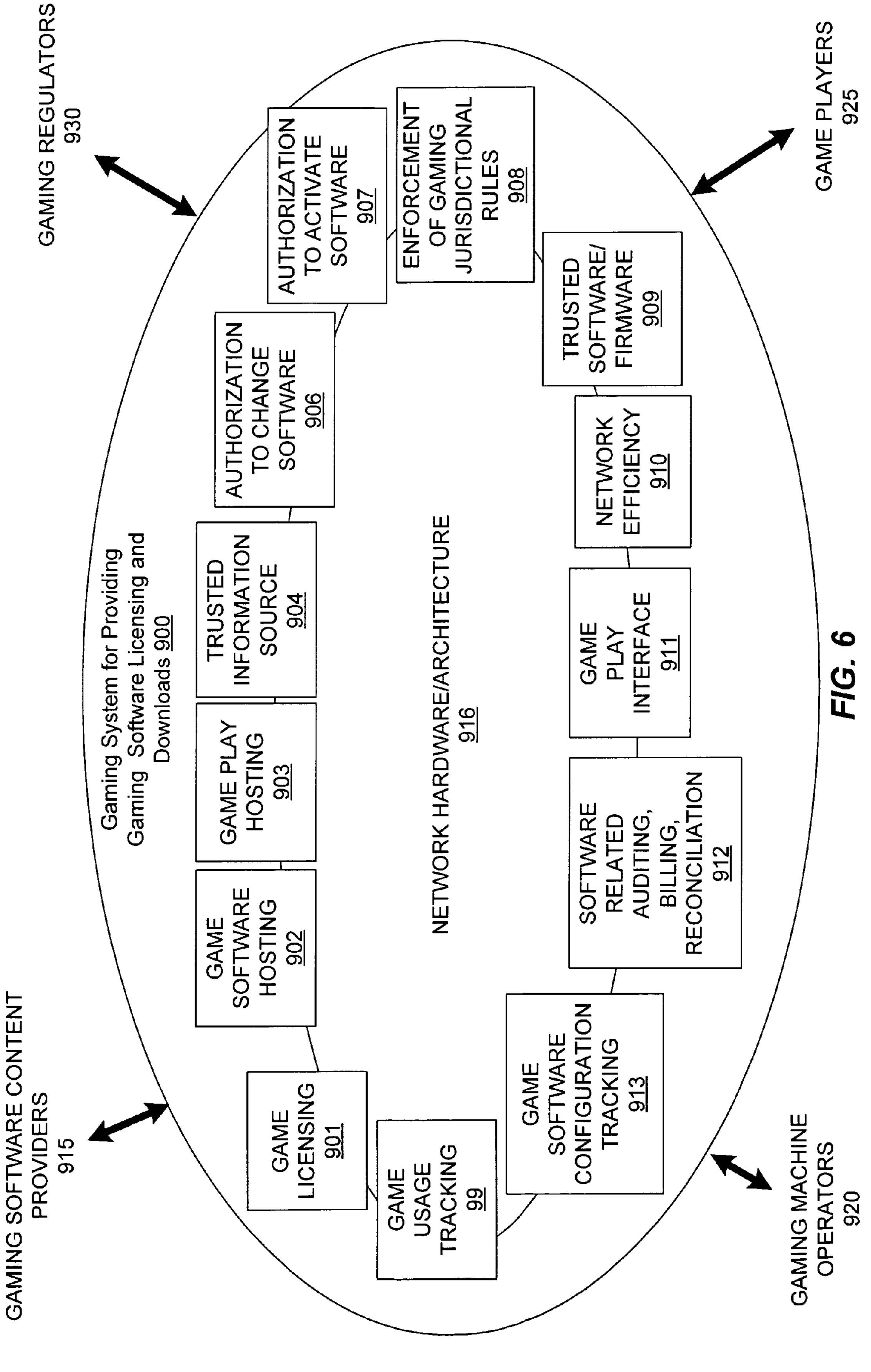
FIG. 6 illustrates a block diagram of a gaming system of the present invention.

FIG. 6 shows a block diagram illustrating components of a gaming system 900 which may be used for implementing various aspects of the present invention. In FIG. 6, the components of a gaming system 900 for providing game software licensing and downloads are described functionally. The described functions may be instantiated in hardware, firmware and/or software and executed on a suitable device. In the system 900, there may be many instances of the same function, such as multiple game play interfaces 911. Nevertheless, in FIG. 6, only one instance of each function is shown. The functions of the components may be combined. For example, a single device may comprise the game play interface 911 and include trusted memory devices or sources 909. The described components and their functions may be incorporated various embodiments of the servers and clients described with respect to FIGS. 1-5.

The gaming system 900 may receive inputs from different groups/entities and output various services and or information to these groups/entities. For example, game players 925 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 900, receive revenue for the use of their software and compensate the gaming machine operators. The gaming regulators 930 may provide rules and regulations that must be applied to the gaming system and may receive reports and other information confirming that rules are being obeyed.

In the following paragraphs, details of each component and some of the interactions between the components are described with respect to FIG. 6. The game software license host 901 may be a server connected to a number of remote gaming devices that provides licensing services to the remote gaming devices. For example, in other embodiments, the license host 901 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 915 may track the usage of game software on a plurality of devices in communication with the host. The game usage-tracking host 915 may be in communication with a plurality of game play hosts and gaming machines. From the game play hosts and gaming machines, the game usage tracking host 915 may receive updates of an amount that each game available for play on the devices has been played and on amount that has been wagered per game. This information may be stored in a database and used for billing according to methods described in a utility based licensing agreement.

The game software host 902 may provide game software downloads, such as downloads of game software or game firmware, to various devious in the game system 900. For example, when the software to generate the game is not available on the game play interface 911, the game software host 902 may download software to generate a selected game of chance played on the game play interface. Further, the game software host 902 may download new game content to a plurality of gaming machines via a request from a gaming machine operator.

In one embodiment, the game software host 902 may also be a game software configuration-tracking host 913. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with the present invention are described in co-pending U.S. Pat. No. 6,645,077, by Rowe, entitled, “Gaming Terminal Data Repository and Information System,” filed Dec. 21, 2000, which is incorporated herein in its entirety and for all purposes.

A game play host device 903 may be a host server connected to a plurality of remote clients that generates games of chance that are displayed on a plurality of remote game play interfaces 911. For example, the game play host device 903 may be a server that provides central determination for a bingo game play played on a plurality of connected game play interfaces 911. As another example, the game play host device 903 may generate games of chance, such as slot games or video card games, for display on a remote client. A game player using the remote client may be able to select from a number of games that are provided on the client by the host device 903. The game play host device 903 may receive game software management services, such as receiving downloads of new game software, from the game software host 902 and may receive game software licensing services, such as the granting or renewing of software licenses for software executed on the device 903, from the game license host 901.

In particular embodiments, the game play interfaces or other gaming devices in the gaming system 900 may be portable devices, such as electronic tokens, cell phones, smart cards, tablet PC’s and PDA’s. The portable devices may support wireless communications and thus, may be referred to as wireless mobile devices. The network hardware architecture 916 may be enabled to support communications between wireless mobile devices and other gaming devices in gaming system. In one embodiment, the wireless mobile devices may be used to play games of chance.

The gaming system 900 may use a number of trusted information sources. Trusted information sources 904 may be devices, such as servers, that provide information used to authenticate/activate other pieces of information. CRC values used to authenticate software, license tokens used to allow the use of software or product activation codes used to activate to software are examples of trusted information that might be provided from a trusted information source 904. Trusted information sources may be a memory device, such as an EPROM, that includes trusted information used to authenticate other information. For example, a game play interface 911 may store a private encryption key in a trusted memory device that is used in a private key-public key encryption scheme to authenticate information from another gaming device.

When a trusted information source 904 is in communication with a remote device via a network, the remote device will employ a verification scheme to verify the identity of the trusted information source. For example, the trusted information source and the remote device may exchange information using public and private encryption keys to verify each other's identities.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 900 of the present invention may include devices 906 that provide authorization to download software from a first device to a second device and devices 907 that provide activation codes or information that allow downloaded software to be activated. The devices, 906 and 907, may be remote servers and may also be trusted information sources. One example of a method of providing product activation codes that may be used with the present invention is describes in previously incorporated U.S. Pat. No. 6,264, 561.

A device 906 that monitors a plurality of gaming devices to determine adherence of the devices to gaming jurisdictional rules 908 may be included in the system 900. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 900 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In the present invention, the devices may be connected by a network 916 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in the present inventions, network efficient devices 910 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in the present invention may provide game software and game licensing related auditing, billing and reconciliation reports to server 912. For example, a software licensing billing server may generate a bill for a gaming device operator based upon a usage of games over a time period on the gaming devices owned by the operator. In another example, a software auditing server may provide reports on game software downloads to various gaming devices in the gaming system 900 and current configurations of the game software on these gaming devices.

At particular time intervals, the software auditing server 912 may also request software configurations from a number of gaming devices in the gaming system. The server may then reconcile the software configuration on each gaming device. In one embodiment, the software auditing server 912 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 6. Many of the interactions are coupled. For example, methods used for game licensing may affect methods used for game downloading and vice versa. For the purposes of explanation, details of a few possible interactions between the components of the system 900 relating to software licensing and software downloads have been described. The descriptions are selected to illustrate particular interactions in the game system 900. These descriptions are provided for the purposes of explanation only and are not intended to limit the scope of the present invention.

Figure 7:
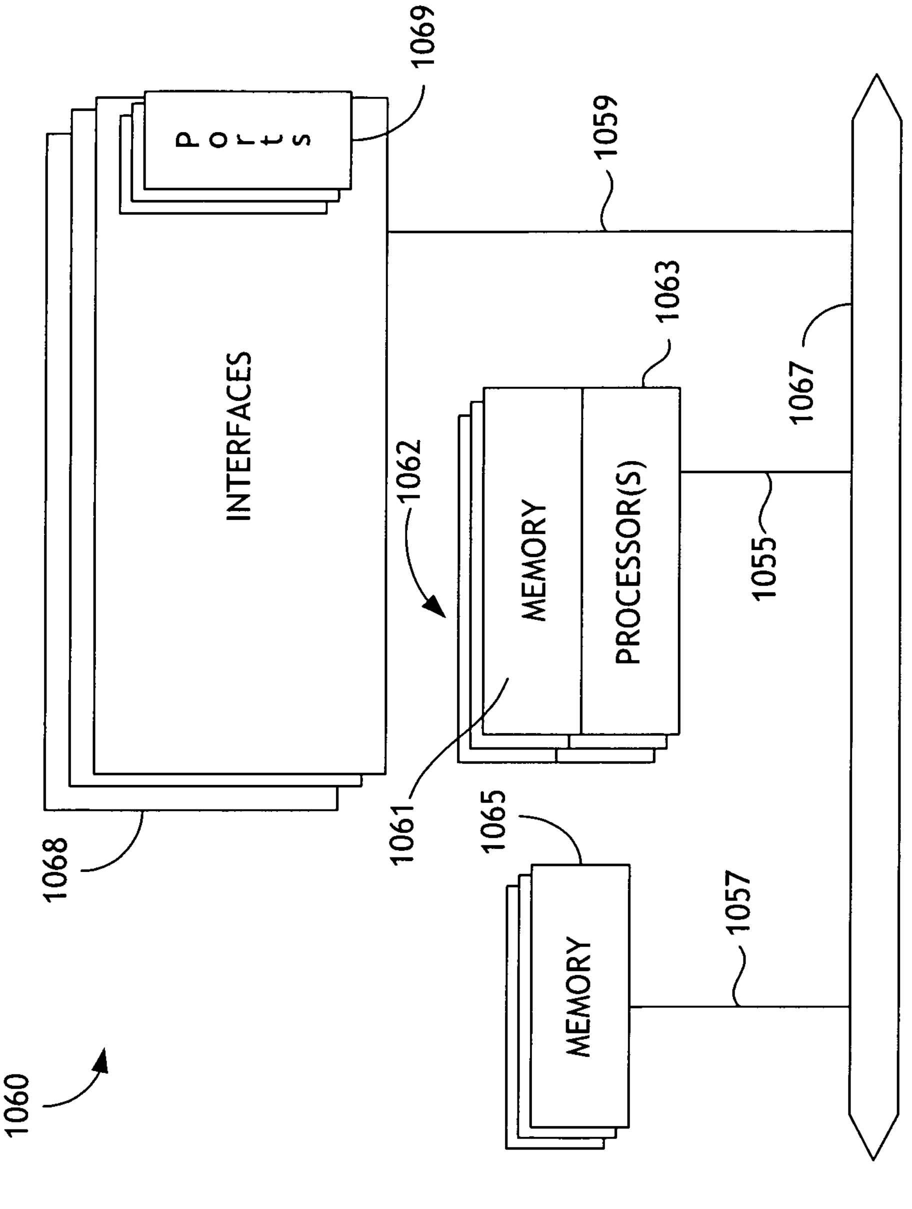
FIG. 7 illustrates a network device that may be configured according to some aspects of the invention.

FIG. 7 illustrates an example of a network device that may be configured for implementing some methods of the present invention, such as methods described with respect to a player management server or game outcome server. Network device 1060 includes a master central processing unit (CPU) 1062, interfaces 1068, and a bus 1067 (e.g., a PCI bus). Generally, interfaces 1068 include ports 1069 appropriate for communication with the appropriate media. In some embodiments, one or more of interfaces 1068 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1068 control such communications-intensive tasks as encryption, decryption, compression, decompression, packetization, media control and management. By providing separate processors for the communications-intensive tasks, interfaces 1068 allow the master microprocessor 1062 efficiently to perform other functions such as routing computations, network diagnostics, security functions, etc.

The interfaces 1068 are typically provided as interface cards (sometimes referred to as "linecards"). Generally, interfaces 1068 control the sending and receiving of data packets over the network and sometimes support other peripherals used with the network device 1060. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1062 may be responsible for implementing specific functions associated with the functions of a desired network device. According to some embodiments, CPU 1062 accomplishes all these functions under the control of software including an operating system and any appropriate applications software.

CPU 1062 may include one or more processors 1063 such as a processor from the Motorola family of microprocessors or the MIPS family of microprocessors. In an alternative embodiment, processor 1063 is specially designed hardware for controlling the operations of network device 1060. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

Regardless of network device's configuration, it may employ one or more memories or memory modules (such as, for example, memory block 1065) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 7 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 7) or switch fabric based (such as a cross-bar).

Although the foregoing invention has been described in detail by way of illustration and example for purposes of clarity and understanding, it will be recognized that the above-described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A network device comprising:

a game outcome server, said game outcome server comprising a first processor and a communication interface and being configured to store a plurality of wagering games, said communication interface being communicatively coupled, over a network, with a remote client device and a player management server, said first processor being configured to:

a) communicate with the remote client device and with the player management server via the communication interface, the player management server comprising a second processor operable to provide fund transfers to a player account and to maintain a player balance, b) receive information from the player management server that allows a communication session to be established directly between the game outcome server and the remote client device, and establish a connection with the remote client device, c) send, directly to the remote client device, first commands, first instructions, first data or combinations thereof that allow an interface for playing a wagering game to be modified on a client interface of the remote client device, wherein the client interface was previously generated based on information exchanged during a previous communication session between the player management server and the remote client device, d) receive, directly from the remote client device, information indicating a request to play the wagering game and a wager amount, e) responsive to step d, send information to the player management server requesting authorization of the wager amount based on the player balance in the player account, f) receive an authorization message from the player management server indicating the wager amount is authorized, whereafter a game outcome for the wagering game is generated and an adjustment to the player balance is calculated, g) send to the remote client device second commands, second instructions, second data or combinations thereof that allows a presentation of the game outcome to be generated on the client interface; and h) send the adjustment to the player balance to the player management server to effect an update of the player balance.

2. The network device of claim 1, wherein the first processor is further configured (i) to generate the game outcome for the wagering game and the adjustment to the player balance prior to sending the information to the player management server indicating the request to authorize the wager amount and (ii) to send the information relating to the game outcome and the adjustment to the player balance with the request to authorize the wager amount.

3. The network device of claim 1, wherein the first processor is further configured to receive from the player management server a request for information related to a first game outcome previously generated on the network device and to send the information related to the first game outcome previously generated on the network device.

4. The network device of claim 1, wherein prior to sending to the client device the first commands, first instructions, first data or combinations thereof for generating the play of the wagering game on the client interface, the first processor is further configured to receive information indicating a selection of the wagering game made on the client device from the player management server.

5. The network device of claim 4, wherein the information indicating a selection of the wagering game is formatted as a Universal Resource Locator (URL) and the first processor is further configured to parse the URL received from the player management server to determine the wagering game to be generated on the client interface.

6. The network device of claim 1, wherein the first processor is further configured to send to the player management server information relating to the wagering game.

7. The network device of claim 6, wherein information relating to the wagering game includes a URL string.

8. The network device of claim 6, wherein the information relating to the wagering game is sent to the player management server prior to receiving the information from the player management server that allows the communication session to be established with the client device.

9. The network device of claim 1, wherein the player management server comprises an on-line casino.

10. The network device of claim 1, wherein the player management server comprises a casino-type gaming machine.

11. The network device of claim 1, wherein the client device is selected from the group consisting of a casino-type gaming machine, a personal computer, a set-top box, a mobile phone and a personal digital assistant.

12. The network device of claim 1, wherein the first processor is further operable to 1) receive a transfer of funds from the player management server, 2) maintain the funds as a temporary balance that is available for at least one wager on the wagering game and 3) add the adjustment to the player balance to the temporary balance to generate a new temporary balance, without sending the information to the player management server indicating the request to authorize the wager amount, without receiving from the player management server the information that indicates the wager amount is authorized and without sending the adjustment to the player balance to the player management server.

13. The network device of claim 12, wherein the first processor is further operable to transfer the temporary balance or the new temporary balance to the player management server to adjust the player balance.

14. The network device of claim 12, wherein the first processor is further configured to receive information indicating a cash-out request from the client device and in response to transfer the temporary balance or the new temporary balance to the player management server to adjust the player balance maintained on the player management server.

15. The network device of claim 12, wherein the first processor is further configured to receive information indicating a request to transfer the temporary balance or the new temporary balance from the player management server and in response to transfer the temporary balance or the new temporary balance to the player management server to adjust the player balance maintained on the player management server.

16. The network device of claim 12, wherein the first processor is further configured to receive information from the client device indicating a request for the transfer of the funds from the player management server and indicating an amount of the funds to transfer and to send the request for the transfer of the funds to the player management server.

17. The network device of claim 1, wherein the first processor is further configured, prior to sending to the client device the first commands, the first instructions, the first data or combinations thereof for generating the play of the wagering game on the client interface, to determine whether the player is located in a legal gaming jurisdiction and is eligible for game play.

18. The network device of claim 17, wherein the determination of whether the player is located in the legal gaming jurisdiction and is eligible for the game play is based upon at least information regarding a player's stated country of residence and a location of the client device.

19. The network device of claim 18, wherein the location of the client device is determined from one or more of an IP address, GPS information or combinations thereof.

20. The network device of claim 1, wherein the first commands, the first instructions, the first data or combinations thereof include one or more application files compatible with a media player executed on the client device.

21. The network device of claim 1, wherein the first commands, the first instructions, the first data or combinations thereof include a software application for execution on the client device.

22. The network device of claim 1, wherein the first processor is further configured to store one or more of the game outcome, the wager amount, the adjustment to the player balance or combinations thereof in a database.

23. The network device of claim 1, wherein the first processor is further configured to store in association with the game outcome one or more of a unique player ID, a game name, a game ID, a game transaction ID, a game transaction time stamp, a currency, a bet amount, a client ID, an account handling device ID or combinations thereof to a database.

24. The network device of claim 1, wherein the first processor is further configured to receive from a remote device information indicating a request to display a list of wagering games that the network device is operable to generate.

25. The network device of claim 24, wherein the remote device comprises the player management server.

26. The network device of claim 24, wherein the first processor is further configured to receive information indicating a selection of a first wagering game from the list of wagering games and to send information relating to the first wagering game to the player management server.

27. The network device of claim 1, wherein the first processor is further configured to receive from the player management server information relating to a brand or an operator of the player management server and to incorporate the information relating to the brand or to the operator of the player management server into the first commands, the first instructions, the first data or combinations thereof such that brand information or client information is generated on the client interface.

28. The network device of claim 1, wherein the first processor is further configured, prior to sending to the client device the first commands, the first instructions, the first data or combinations thereof that allows the interface for playing the wagering game to be generated on the client interface, to authenticate an identity of the player management server.

29. The network device of claim 1, wherein the first processor is further configured to receive information from the player management server that the wagering game is to be played for free.

30. A network device comprising:

a game outcome server, said game outcome server comprising a first processor configured to store a plurality of selectable wagering games, and to communicate with a remote client device and a player management server, said first processor being configured to:

a) communicate with the remote client device and with the player management server, the player management server having a second processor operable to provide fund transfers to a player account and to maintain a player balance, b) receive information from the player management server that allows a communication session to be established directly between the game outcome server and the remote client device, and establish a connection with the remote client device, c) send, directly to the remote client device, first commands, first instructions, first data or combinations thereof that allow an interface for playing a wagering game to be modified on a client interface of the remote client device, wherein the client interface was previously generated based on information exchanged during a previous communication session between the player management server and the remote client device, d) receive, directly from the remote client device, information indicating a request to play the wagering game and a wager amount, e) generate a game outcome for the wagering game and an adjustment to a player balance, f) send information to the player management server requesting authorization of a game transaction wherein the request to authorize the game transaction includes information relating to the wager amount, the game outcome and the adjustment to the player balance, g) receive an authorization message from the player management server indicating the game transaction is authorized, and then send to the client device second commands, second instructions, second data or combinations thereof that allows a presentation of the game outcome to be generated on the client interface; and h) store a record of the game transaction.

31. A network device comprising:

a game outcome server, said game outcome server comprising a first processor and a communication interface and being configured to store a plurality of selectable wagering games, and to communicate with a remote client device and a player management server, said first processor being configured to:

a) communicate with the remote client device and with the player management server, the player management server having a second processor operable to provide fund transfers to a player account and to maintain a player balance, b) receive information from the player management server that allows a session for communication of game data to be established between the first processor and the remote client device directly without flow of the game data through the player management server during the session, and establish a connection with the remote client device, c) send, directly to the remote client device, the game data comprising first commands, first instructions, first data or combinations thereof for generating play of a wagering game on a client interface of the remote client device and for modifying the client interface, wherein the client interface was previously generated based on information exchanged during a previous communication session between the player management server and the remote client device, d) receive from the player management server a transfer of funds deducted from a player balance maintained on the player management server, e) maintain the funds as a temporary balance that is available for at least one wager on the wagering game, f) receive, directly from the remote client device, information indicating a request to play the wagering game and a wager amount, g) generate a game outcome for the wagering game and a balance adjustment, h) add the balance adjustment to the temporary balance to update the temporary balance, i) send directly to the client device second commands, second instructions, second data or combinations thereof that allows a presentation of the game outcome to be generated on the client interface; and j) send the updated temporary balance to the player management server.

* * * * *